United States Patent
Valle et al.

(10) Patent No.: US 12,347,906 B2
(45) Date of Patent: Jul. 1, 2025

(54) ORGANIC-INORGANIC HYBRID NANOFIBRES HAVING A MESOPOROUS INORGANIC PHASE, PREPARATION THEREOF BY ELECTROSPINNING, MEMBRANE, ELECTRODE, AND FUEL CELL

(75) Inventors: Karine Valle, Tours (FR); Philippe Belleville, Tours (FR); Franck Pereira, Monts (FR); Chrystel Laberty, Montrouge (FR); Clément Sanchez, Bures sur Yvette (FR); John Bass, San Francisco, CA (US)

(73) Assignees: Commissariat A L'Energie Atomique Et Aux Energies Alternatives, Paris (FR); Centre National De La Recherche Scientifique, Paris (FR); Universite Pierre Et Marie Curie (Paris 6), Paris (FR)

( * ) Notice: Subject to any disclaimer, the term of this patent is extended or adjusted under 35 U.S.C. 154(b) by 1509 days.

(21) Appl. No.: 13/639,476

(22) PCT Filed: Apr. 6, 2011

(86) PCT No.: PCT/EP2011/055377
§ 371 (c)(1),
(2), (4) Date: May 29, 2013

(87) PCT Pub. No.: WO2011/124622
PCT Pub. Date: Oct. 13, 2011

(65) Prior Publication Data
US 2013/0260283 A1    Oct. 3, 2013

(30) Foreign Application Priority Data

Apr. 6, 2010   (FR) ...................... 1052577

(51) Int. Cl.
| | |
|---|---|
| *H01M 8/1041* | (2016.01) |
| *B29C 48/05* | (2019.01) |
| *C04B 35/622* | (2006.01) |
| *C04B 35/624* | (2006.01) |
| *C04B 35/626* | (2006.01) |
| *C04B 35/634* | (2006.01) |
| *D01D 5/00* | (2006.01) |
| *H01M 4/66* | (2006.01) |
| *H01M 4/86* | (2006.01) |
| *H01M 4/90* | (2006.01) |
| *H01M 8/1007* | (2016.01) |

(52) U.S. Cl.
CPC .......... *H01M 8/1041* (2013.01); *B29C 48/05* (2019.02); *C04B 35/62231* (2013.01); *C04B 35/62236* (2013.01); *C04B 35/6224* (2013.01); *C04B 35/6225* (2013.01); *C04B 35/62259* (2013.01); *C04B 35/62263* (2013.01); *C04B 35/624* (2013.01); *C04B 35/6269* (2013.01); *C04B 35/634* (2013.01); *C04B 35/63436* (2013.01); *C04B 35/63488* (2013.01); *D01D 5/0038* (2013.01); *H01M 4/663* (2013.01); *H01M 4/8605* (2013.01); *H01M 4/8657* (2013.01); *H01M 4/90* (2013.01); *H01M 8/1007* (2016.02); *C04B 2235/441* (2013.01); *C04B 2235/6021* (2013.01)

(58) Field of Classification Search
CPC .......................... H01M 8/1041; H01M 4/8657
USPC ........................................ 429/492, 530, 477
See application file for complete search history.

(56) References Cited

U.S. PATENT DOCUMENTS

| | | | | |
|---|---|---|---|---|
| 6,326,326 | B1 * | 12/2001 | Feng ................... | B01J 20/0211 423/701 |
| 2003/0168756 | A1 | 9/2003 | Balkus et al. | |
| 2006/0293169 | A1 * | 12/2006 | Srinivasan ............ | B82Y 15/00 502/60 |

FOREIGN PATENT DOCUMENTS

| | | | |
|---|---|---|---|
| JP | 62218424 A | * | 9/1987 |
| KR | 2010025473 A | * | 3/2010 |

OTHER PUBLICATIONS

Srinivasan, et al., "Synthesis of novel micro-and mesoporous zeolite nanostuctures using electrospinning techniques", Journal of Electronic Materials, vol. 35, No. 3, Mar. 1, 2006, pp. 504-509.
Zhao, et al., "Fabrication of refining mesoporous silica nanofibers via electrospinning", Materials Letters, vol. 62, No. 1, May 1, 2007, pp. 143-146.
Madhugiri, et al., "Electrospun MEH-PPV/SBA-15 Composite Nanfibers Using a Dual Syringe Method", Journal of the American Chemical Society, vol. 125, Oct. 31, 2003, pp. 14531-14538.
Pereira et al., "Advanced mesostructured hybrid silica-nafion membranes for high-performance PEM fuel cell", Chemistry of Materials, vol. 20, Feb. 16, 2008, pp. 1710-1718.
International Search Report issued on Oct. 4, 2011 for International Application No. PCT/EP2011/055377.

(Continued)

Primary Examiner — Elizabeth M Imani
(74) Attorney, Agent, or Firm — Knobbe, Martens, Olson & Bear, LLP

(57) ABSTRACT

Organic-inorganic hybrid nanofibres comprising two phases:
- a first mineral phase comprising a structured mesoporous network with open porosity; and
- a second organic phase comprising an organic polymer, wherein said organic phase is basically not present inside the pores of the structured mesoporous network.

A membrane and an electrode comprising said nanofibres.
A fuel cell comprising said membrane and/or said electrode.
A method of preparing said nanofibres by electrically assisted extrusion (electrospinning).

39 Claims, 4 Drawing Sheets

(56) References Cited

OTHER PUBLICATIONS

Baughman et al., "Carbon-Nanotubes—the Route Toward Applications," *Science* 297 2002, pp. 787-792.
Bognitzki et al., "Nanostructured Fibers via Electrospinning," *Adv. Mater* 13, 2001, pp. 70-72.
Bognitzki et al., "Preparation of Fibers with Nanoscaled Morphologies: Electrospinning of Polymer Blends," *Polymer Engineering and Science*, 41, 2001, pp. 982-989.
Caruso et al., "Titanium Dioxide Tubes from Sol-Gel Coating of Electrospun Polymer Fibers," *Adv. Mater* 13, 2001, pp. 1577-1579.
Casper et al., "Controlling Surface Morphology of Electrospun Polystyrene Fibers: Effect of Humidity and Molecular Weight in the Electrospinning Process," *Macromolecules* 2004, 37, pp. 573-578.
Chen et al., "Electrospinning and Solution Properties of Nafion and Poly(acrylic acid)," *Macromolecules* 41, 2008, pp. 128-135.
Choi et al., "Nanofiber Network Ion-Exchange Membranes," *Macromolecules* 2008, 41, pp. 4569-4572, with 6 pages of Supporting Info.
Choi, et al., "Silica nanofibers from electrospinning/sol-gel process," *J. Mater. Sci Lett.* 2003, 22, pp. 891-893.
Dai et al., "A novel method for preparing ultra-fine alumina-boarte oxide fibres via an electrospinning technique," *Nanotechnology* 13 (2002) pp. 674-677.
Dharmaraj et al., "Preparation and morphology of magnesium titanate nanofibres via electrospinning," *Inorg. Chem. Comm.* 2004, 7, pp. 431-433.
Ding et al., "Morphology and crystalline phase study of electrospun $TiO_2$—$SiO_2$ nanofibres," *Nanotechnology* 2003, 14, pp. 532-537.
Dong et al., "Sub-micrometer Conducting Polyaniline Tubes Prepared from Polymer Fiber Templates," *Chem. Mater* 2004, 16, pp. 371-373, with 2 pages of Supporting Info.
Drew et al., "Journal of Macromolecular Science, Part A: Pure and Applied Chemistry," *J. Macromol Sci, Pure Appl Chem.* A40, 2003, pp. 1415-1422.
Dror et al., "Carbon Nanotubes Embedded in Oriented Polymer Nanofibers by Electrospinning," *Langmuir* 19, 2003, pp. 7012-7020.
Formo et al., "Functionalization of Electrospun $TiO_2$ Nanofibers with Pt Nanoparticles and Nanowires for Catalytic Applications," *Nanoletters*, 8, 2008, pp. 668-672.
Goldberger et al., "Single-crystal gallium nitride nanotubes," *Nature* 422, 2003, pp. 599-602.
Gouma, P.I., "Nanostructured Polymorphic Oxides for Advanced Chemosensors," *Rev. Adv. Mater. Sci.* 5, 2003, pp. 147-154.
Guan et al., "A novel method for making CuO superfine fibres via an electrospinning technique," *Inorg. Chem. Comm.* 2003, 6, pp. 1409-1411.
Guan et al., "Preparation and characterization of NiO nanofibres via an electrospinning technique," *Inorg. Chem. Comm.*, 6 (2003) pp. 1302-1303.
Hao et al., "Electrospinning: a simple method to obtain CU/PVA nanoparticles with a core-shell structure," *Polymer Preprints*, 2003, 44(2), p. 149.
Hou et al., "Poly(p-xylylene) Nanotubes by Coating and Removal of Ultrathin Polymer Template Fibers," *Macromolecules*, 35, 2002, 2429-2431.
Hou et al., "Carbon Nanotubes on Carbon Nanofibers: A Novel Structure Based on Electrospun Polymer Nanofibers," *Adv. Mater.* 2004, 16, No. 1, pp. 69-73.
Kataphinan et al., "High-temperature fiber matrices: Electrospinning and rare-earth modification," *J. Vac. Sci. Technol.*, A 21(4), Jul./Aug. 2003, pp. 1574-1578.
Kim et al., "The incorporation of an antibiotic drug in electrospun poly(lactide-co-glycolide) non-woven nanofiber scaffolds," *Polymer Preprints*, 2003, 44(2), pp. 98-99.
Ko et al., "Electrospinning of Continuous Carbon Nanotube-Filled Nanofiber Yarns," *Adv. Mater.* 15, No. 14, 2003, pp. 1161-1165.
Larsen et al., "A Method for Making Inorganic and Hybrid (Organic/Inorganic) Fibers and Vesicles with Diameters in the Submicrometer and Mircrometer Range via sol-Gel Chemistry and Electrically Forced liquid Jets," *J. Am. Chem. Soc.*, 125, 2003, pp. 1154-1155.
Li et al., "Fabrication of Titania Nanofibers by Electrospinning," *Nano Lett.*, vol. 3, No. 4, 2003, pp. 555-560.
Li et al., "Magnetic nanofibers of nickel ferrite prepared by electrospinning," *Appl. Phys. Lett.*, vol. 83, No. 22, 2003, pp. 4586-4588.
Li et al., "Electrospinning of Polymeric and Ceramic Nanofibers as Uniaxially Aligned Arrays," *Nano Lett.*, vol. 3, No. 8, 2003, 3, pp. 1167-1171.
Li et al., "Direct Fabrication of Composite and Ceramic Hollow Nanofibers by Electrospinning," *Nano. Lett.* vol. 4, No. 5, 2004, pp. 933-938.
Loscertales et al., "Electrically Forced Coaxial Nanojets for One-Step Hollow Nanofiber Design," *J. Am. Chem. Soc.*, 126, 2004, pp. 5376-5366.
Luu et al., "Development of a nanostructured DNA delivery scaffold via electrospinning of PLGA and PLA-PEG block copolymers," *J. Controlled Release*, 89, 2003, pp. 341-353.
Madhugiri et al., "Electrospun mesoporous molecular sieve fibers," *Micro. and Meso. Mater.*, 63, 2003, pp. 75-84.
Madhugiri et al., "Electrospun Mesoporous Molecuular [sic] Sieve Fibers," *Polymer Preprints*, 2003, 44(2), pp. 86-87.
Martin, Charles R., "Nanomaterials: A Membrane-Based Synthetic Approach," *Science*, vol. 266, Dec. 23, 1994, pp. 1961-1966.
Mayers et al., "Hollow Nanostructures of Platinum with Controllable Dimensions Can Be Synthesized by Templating Against Selenium Nanowires and Colloids," *J. Am. Chem. Soc.*, 125, 2003, pp. 13364-13365.
Megelski et al., "Micro- and Nanostructured Surface Morphology on Electrospun Polymer Fibers," *Macromolecules*, 35, 2002, pp. 8456-8466.
Ochanda et al., "Gold Nanotubes by Fiber Templating Techniques," *Polymer Preprints*, 2003, 44(2), pp. 161-162.
Pedicini et al., "Thermally Induced Color Change in Elecrospun Fiber Mats," *J. Polym. Sci, PoLym. Phys. Ed.*, 42, 2004, pp. 752-757.
Ramakrishna et al., "Electrospun nanofibers: solving global issues," *Materials Today*, vol. 9, No. 3, Mar. 2006, pp. 40-50.
Rouquerol et al., "Recommendations for the Characterization of Porous Solids," *Pure & Appl. Chem.*, vol. 66, No. 8, 1994, pp. 1739-1758.
Sanders et al., "Two-Phase Electrospinning from a Single Electrified Jet: Microencapsulation of Aqueous Reservoirs in Poly(ethylene-co-vinyl acetate) Fibers," *Macromolecules*, 36, 2003, pp. 3803-3805.
Sen et al., "Preparation of Single-Walled Carbon Nanotube Reinforced Polystyrene and Polyurethane Nanofibers and Membranes by Electrospinning," *Nano Lett.*, vol. 4, No. 3, 2004, pp. 459-464.
Senecal et al., "Photoelectric Response From Nanofibous Membranes," *Mater. Res. Soc. Symp. Proc.*, vol. 708, © 2002, pp. 285-289.
Seoul, C., "Electrospinning of Poly(vinylidene fluoride)/Dimethylformamide Solutions with Carbon Nanotubes," *J. Polymer Sci*, Part B: Polymer Phys., vol. 41, 2003, pp. 1572-1577.
Shao et al., "Fiber mats of poly(vinyl alcohol)/silica composite via electrospinning," *Mat. Lett.*, 57 (2003), pp. 1579-1584.
Steinhart et al., "Palladium Nanotubes with Tailored Wall Morphologies," *Adv. Mater.*, 15, No. 9, 2003, pp. 706-709.
Stuckey et al., "Electrospinning of conductive polymer nanofibers containing carbon nanotubes," *Polymer Preprints*, 2003, 44(2), p. 141.
Sun et al., "Compound Core-Shell Polymer Nanofibers by Co-Electrospinning," *Adv. Mater.*, 15, No. 22, Nov. 17, 2003, pp. 1929-1932.
Sun et al., "Multiple-Walled Nanotubes Made of Metals," *Adv. Mater*, 16, No. 3, Feb. 3, 2004, pp. 264-268.
Tenne, Reshef, "Advances in the Synthesis of Inorganic Nanotubes and Fullerene-Like Nanoparticles," *Angew. Chem. Int. Ed.*, 42, 2003, pp. 5124-5132.
Viriyabanthorn et al., "Effect of carbon black loading on electrospun butyl rubber nonwoven mats," *Polymer Preprints*, 2003, 44(2), pp. 136-137.

(56) References Cited

OTHER PUBLICATIONS

Viswanathamurthi et al., "Preparation and morphology of niobium oxide fibres by electrospinning," *Chem. Phys. Lett.*, 374, 2003, pp. 79-84.
Viswanathamurthi et al., "Vanadium pentoxide nanofibers by electrospinning," *Scripta Materialia*, 49, 2003, pp. 577-581.
Wang et al., "Synthesis and characterization of micro/nanoscopic $Pb(Zr_{0.52}Ti_{0.48})O_3$ fibers by electrospinning," *Appl. Phys.*, A 78, (2004) pp. 1043-1047.
Wei et al., "Phase morphology of elecrospun nanofibers from polybutadiene (PB)/polycarbonate (PC) blends," *Polymer Preprints*, 2003, 44(2), pp. 79-80.
Yang et al., "Preparation and Characterization of a Pan Nanofibre Containing AG Nanoparticles Via Electrospinning," *Synthetic Metals*, 137, 2003, pp. 973-974.
Yang et al., "Preparation and characterization of ZnO nanofibers by using electrospun PVA/zinc acetate composite fiber ad precursor," *Inorg. Chem. Comm.*, 7 (2004) pp. 176-178.
Yang et al., "Nanomagnetic particle filled piezoelectric polymer nanocomposite wires by co-electrospinning," Polymer Preprints 2003, 44(2), p. 163.
Zeng et al., "Biodegradable electrospun fibers for drug delivery," *J Controlled Release* 92, 2003, pp. 227-231.
International Preliminary Report on Patentability dated Aug. 2, 2012 for International Application No. PCT/EP2011/055377.

\* cited by examiner

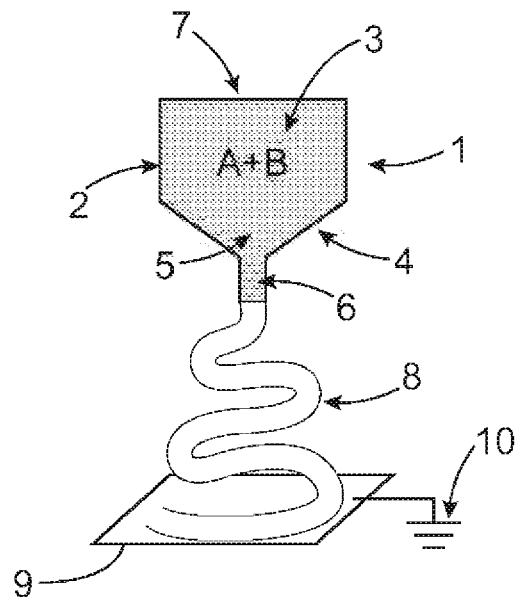
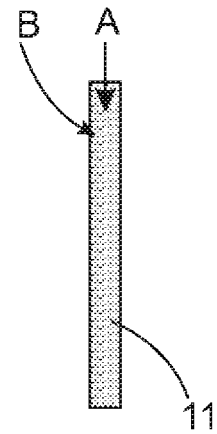
FIG.1A                FIG.1B
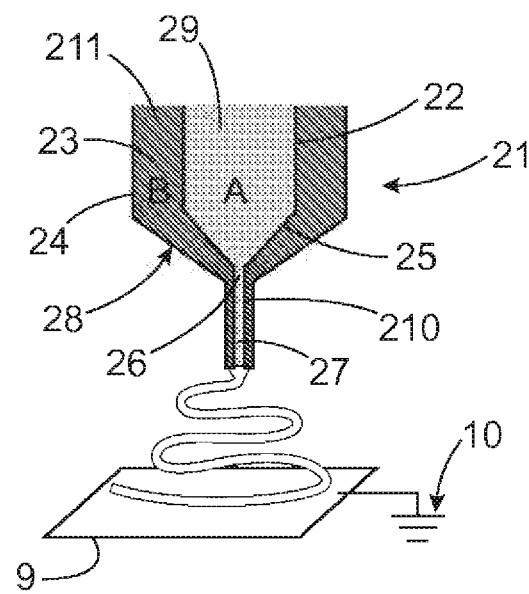
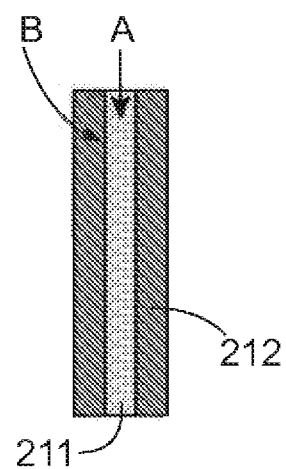
FIG.2A                FIG.2B

ORGANIC-INORGANIC HYBRID NANOFIBRES HAVING A MESOPOROUS INORGANIC PHASE, PREPARATION THEREOF BY ELECTROSPINNING, MEMBRANE, ELECTRODE, AND FUEL CELL

CROSS REFERENCE TO RELATED APPLICATIONS

This application is the U.S. National Phase of International Application No. PCT/EP2011/055377, filed Apr. 6, 2011, designating the U.S. and published as WO 2011/124622 on Oct. 13, 2011 which claims the benefit of French Patent Application No. 1052577 filed Apr. 6, 2010.

TECHNICAL FIELD

The present invention concerns organic-inorganic hybrid nanofibres comprising a mesoporous mineral, inorganic, phase, and an organic phase.

The invention also concerns a method for preparing these nanofibres by electrically assisted extrusion (also called "electrospinning").

The invention also concerns a membrane and an electrode comprising these nanofibres.

The invention also relates to a fuel cell comprising at least one such membrane and/or at least one such electrode.

The technical field of the invention may be defined, generally, as that of porous materials, and more specifically as that of materials known as mesoporous materials, and in particular as that of mesoporous organic-inorganic hybrid materials.

More specifically still, the invention is in the field of mesoporous materials intended for uses in electrochemistry, in particular in fuel cells, such as "PEMFCs" (Polymeric Electrolyte Membrane Fuel Cells), also called proton exchange membrane fuel cells.

BACKGROUND

It is known that one of the essential elements of fuel cells, for example those used in the automotive and mobile telephones sectors, is the proton exchange membrane.

These electrolytic membranes structure the core of the fuel cell, and must consequently have satisfactory properties in terms of proton conduction, and also a low permeability to the reactive gases ($H_2/O_2$). The properties of the materials which constitute the polymeric solid electrolytes forming these membranes, and which must resist to thousands of hours of operation of the cell, are essentially chemical stability, and resistance to hydrolysis and oxidation, and in particular hydrothermal resistance, and a certain mechanical flexibility.

Membranes prepared from perfluorinated ionomers, such as Nafion®, satisfy these requirements for operating temperatures of less than 90° C.

This temperature is, however, insufficient to allow fuel cells comprising such membranes to be incorporated in a vehicle. Indeed, incorporation in vehicles supposes an operating temperature rise to around 100-150° C. with the aim of increasing the efficiency of the current/energy conversion, and therefore the efficiency of the cell, of reducing the poisoning of the catalysts by carbon monoxide, but also of improving control of thermal management by reducing the volume of the radiator.

Furthermore, conduction efficiency of proton membranes is strongly related to the presence of water in the medium. And at temperatures of over 100° C. water is rapidly evacuated from the membrane, conductivity drops and permeability to the fuel increases. At these temperatures this reduction in performances may be accompanied by deterioration of the membrane. To resolve the problems of drying of the membranes in fuel cells at high temperature, i.e. at a temperature at least equal to 100° C., a maximum relative humidity of 80-100% must be maintained, but this is difficult to accomplish by an external source.

Conversely, it is known that the insertion or increase of a hygroscopic filler "in situ" improves water retention within the polymer, delays this process of dehydration of the proton medium, and thus allows proton conduction. In addition to its hydrophilic character, this functional filler may intrinsically have conducting properties, and may thus increase the performances of the membrane.

To increase water retention in membranes in fuel cells at high temperature many composite membranes have been developed, notably through the growth of hydrophilic inorganic nanoparticles. These mineral nano-fillers may be synthesised by a sol-gel route in perfluorinated sulphonated organic matrices, but also in matrices consisting of polyaromatic compounds, or of polyethers. These membranes are currently called organic-inorganic hybrid membranes.

The mineral particles may be conductive, or alternatively non-conductive and simply hydrophilic, such as oxides of metals and metalloids.

In addition to the improvement of water management at high temperature, reduced permeability of the membrane to the fuels is demonstrated in these organic-inorganic hybrid membranes, compared to conventional membranes of the Nafion® type, for example. Thermal and chemical stability however remains limited, since it is inherent to the sulphonated organic polymer matrix used.

In parallel with the composite or organic-inorganic hybrid materials described above, mesoporous materials initially devised for catalysis, i.e. essentially silica and the aluminosilicates, have begun to attract the attention of some electrochemists.

It should be recalled that materials known as mesoporous materials are solids which have within their structure pores which are typically between 1 and 100 nm, and preferably between 2 and 50 nm, in size, which is intermediate between that of micropores (compounds of the zeolite type) and that of macropores.

Typically, mesoporous materials are amorphous or crystalline metal oxides in which the pores are generally distributed randomly, with a very wide distribution of pore size.

Structured mesoporous materials, called "mesostructured" materials are, for their part, structured porous networks which have an organised spatial configuration, design, of mesopores. This spatial periodicity of the pores is characterised by the appearance of at least one diffraction peak at the low angles in an X-ray diffraction pattern; this peak is associated with a repetition distance which is generally comprised between 2 and 50 nm. The mesostructure is checked by Transmission Electron Microscopy. Mesoporosity may be free or functionalised by chemical functional groups or nanoparticles.

In relation thereto, the sol-gel method provides innovative strategies in the construction of these organised mesoporous structures, edifices, notably by inorganic polymerisation within organised molecular systems (SMO) of surfactants, or within organised polymeric systems (SPO) of block copolymers.

In the presence of texturizing agents of the SMO type, the mild sol-gel chemistry enables such mesostructured networks of an organomineral nature, called organic-inorganic hybrid materials, to be synthesised from inorganic and organometallic precursors. The properties of these mesoporous organic-inorganic hybrid materials depend not only on the chemical nature of the organic and inorganic components, but also on the synergy which may occur between these two chemistries.

This is the reason why these materials are often called "multifunctional" materials.

The degree of organisation is determined by the nature of these two organic and inorganic entities, but also by the multi-scale layout of this arrangement. Thus, incorporation in an ordered mesoporous structure, both in the "walls" and in the pores, of chemical functionalities able to induce specific properties, is of great interest in various applications, for example in catalysis, filtration and electrochemistry.

In addition, the texturizing of the mesostructured networks in the form of nanofibres leads to the formation of fabrics, membranes and films.

In addition, the use of such mesoporous hybrid fibres in fuel cells provides many possibilities favouring transport properties and continuity of conducting paths.

In fuel cells the membranes act as a support for the catalytic materials responsible for oxidation of the hydrogen at the anode, and for reduction of the oxygen at the cathode, and therefore generally consist of three main constituents, namely an electrical conductor such as carbon, an electrolyte, and a catalytic material such as platinum particles which catalyse the oxidation-reduction reactions. These reactions mainly occur at the interface of these three constituents (the triple point), which must therefore be accessible to the reactive gases. One of the main objectives which must be met in a fuel cell is to reduce and rationalise the quantity of catalyst, such as platinum.

These membrane materials are currently shaped by methods using a "liquid route", such as coating, or alternatively by methods using a "molten route", such as extrusion.

Although the possible use in electrochemical devices of mesoporous inorganic materials, such as mesostructured mesoporous silica constructed by SMO and SPO, has previously been mentioned, it has been shown that such materials cannot lead to a direct application in fuel cells, since it is impossible to put them in the form of fibres constituting a membrane by using the methods mentioned above.

There is therefore a need for a mesoporous material which is able to be produced in the form of fibres constituting a membrane, in particular a homogeneous and flexible membrane.

The electrically assisted extrusion method (also called "electrospinning") is also known.

Electrically assisted extrusion is a construction, shaping, method which leads to the production of fibres by applying a high difference of potential between the end of a metal needle connected to a syringe containing the chemical solution, and a conductive electrode bracket, holder, positioned at a given distance from the said syringe in order to harvest the fibres formed in this manner.

Prior work on the electrically assisted extrusion method has related essentially to the manufacture of polymer nanofibres. This choice is guided by the method itself, which requires that solutions of a visco-elastic character are used. Recent work shows that "sol-gel" solutions, due to their physico-chemical characteristics, are very suitable for this type of deposition, and constitute an interesting synthesis route for the production, in particular, of composite or ceramic nanofibres.

Use of inorganic sols has enabled the synthesis of silica nanofibres [1], composite oxide/oxide nanofibres ($TiO_2$/$SiO_2$) [2], mono-metallic ceramic nanofibres ($Al_2O_3$) [2] and heterometallic ceramic nanofibres ($PbZr_xTi_{1-x}O_3$ (PZT)) [3].

The morphology of the nanofibres depends on many parameters relating to the equipment such as the applied voltage, the distance between the needle and the electrode, the size of the needle, etc., but also on the physico-chemical characteristics of the solution, such as its rheology, surface tension, concentration, etc.

In these syntheses, the works of the literature show that the sol-gel transition may occur in the initial solution or in the course of preparing the fibres [5]. According to this data from the literature, the moment when this step occurs does not seem to influence the morphology of the fibres.

The incorporation of an organic polymer, such as PVP, in the sol-gel precursors solution, such as alkoxides of transition metals, may be used to increase and control the viscosity of the solution which is to be "electrospun", and therefore to give it its visco-elastic characteristics. Under these conditions a three-dimensional continuous inorganic network is formed within the polymer matrix. Fibres consisting of an organic/inorganic composite network are then directly obtained. Elimination of the organic phase by heat treatment allows synthesis of ceramic fibres.

This method has been used for the synthesis of various oxides, such as: $TiO_2$, $SiO_2$, $SnO_2$, ITO, $GeO_2$, $NiFe_2O_4$, $LiCoO_2$ and $BaTiO_3$. In addition to PVP, various host polymers are cited in the literature, such as poly(vinyl alcohol) (PVA), poly(vinyl acetate) and PEO [6]. There are therefore many combinations between the "host" polymer and the "guest" inorganic network. As a consequence, a large variety of oxide nanofibres are mentioned: $Al_2O_3$, CuO, NiO, $TiO_2$—$SiO_2$, $V_2O_5$, ZnO, $Co_3O_4$, $Nb_2O_5$, $MoO_3$ and $MgTiO_3$ [6].

In addition, ceramic nanofibres other than oxides are also prepared by this method. Thus, document [2] describes the synthesis of SiC fibres by electrospinning from a solution of novolac resin and tetraethyl orthosilicate, followed by high-temperature pyrolysis.

Electrically assisted extrusion also allows the synthesis of hollow nanotubes or nanofibres [13, 14]. In this case, a different experimental device is used [15, 16]. Two viscous solutions, which are not mutually miscible, are placed in the coaxial capillaries. This may be, for example, a mineral oil and a solution of $PVP/Ti(O/Pr)_4$. Using this technique it is possible to obtain nanofibres the core of which consists of mineral oil, and in surface of a $TiO_2$/PVP composite. A selective dissolution of the mineral oil enables fibres consisting of $TiO_2$/PVP composite walls to be obtained. Polycrystalline ceramic fibres may also be synthesised, in this case by simultaneously eliminating the PVP and the mineral oil by a judicious heat treatment.

The introduction of nanoparticles inside these fibres is also described in the literature. In this case, it is necessary to disperse beforehand the nanoparticles in the mineral oil.

The surface of the nanofibres may also be increased by creating porosity. Increasing the specific surface area of the nanofibres is of interest for many applications, such as catalysis, fuel cells, batteries and solar cells. To create porosity in these nanofibres two approaches are described in the literature.

The first consists in inducing porosity during the sol-gel synthesis of the metal oxide nanofibres, and in giving this porosity a particular structure through the use of texturizing agents such as surfactants. Mesostructured nanofibres are synthesised and the porosity is released during the heat treatment of the fibres by eliminating the structuring agent. Various compositions have thus been studied with $SiO_2$, $TiO_2$, $Ta_2O_5$, $TaNbO_5$ and also $Nb_2O_5$ and $V_2O_5$ [4].

The second approach consists in using an experimental device having two coaxial capillaries for the flow of the solution, of the same type as the one used for the synthesis of hollow fibres. In document [16b] this device is used to prepare nanofibres made of porous ceramics. Two polymers which are not mutually miscible are used, one of which is blended with the organometallic precursors of the inorganic phase. The polymers are diluted in two solvents which are mutually miscible and the solutions are placed in each of the reactors. During the process the two media are mixed with each other, causing in the "jet" a phase separation between the two organic polymers. After calcination the organic polymers break down, leaving the porosity behind. The resulting fibres therefore become very porous.

In the first approach and in the second as well, approach porosity is generated during heat treatment, in particular a calcination treatment, and no chemical functionality remains.

The development of membrane materials by electrically assisted extrusion for an application in fuel cells has just begun to arouse interest [21], [22]. The first document relates to the assisted extrusion of Nafion® or of electrolytic polymers such as polysulfones.

More specifically, document [21] describes the preparation of membranes in four steps, including the formation of proton-conductive nanofibres, the creation of a network of interconnected fibres, and the filling of the porosity between the fibres by an inert polymer.

The foregoing illustrates that there is a need for nanofibres made of an organic-inorganic hybrid material comprising a first mineral phase comprising a structured mesoporous network with open porosity, and a second organic phase comprising an organic polymer.

There is notably a need for nanofibres made of a mesostructured organic-inorganic hybrid material having organic functional groups which are bonded, preferably covalently, to the mesoporous network, which is made for example of metal oxide or metalloid oxide.

One goal of the present invention is to meet these needs, and to provide such nanofibres made of an organic-inorganic hybrid material comprising a structured inorganic mesoporous network.

The goal of the present invention is also to provide a method for preparing these nanofibres which is simple and reliable, and which in particular enables organic-inorganic hybrid nanofibres to be obtained comprising organic chemical functional groups which are bonded to the structured inorganic mesoporous network.

Another goal of the present invention is to provide such nanofibres and a method for preparing these nanofibres not having the drawbacks, faults, limitations and disadvantages of the organic-inorganic hybrid nanofibres and of the methods of preparing organic-inorganic hybrid nanofibres of the prior art, and which overcome the problems of the hybrid nanofibres and of the methods for preparing hybrid nanofibres of the prior art.

DESCRIPTION OF THE INVENTION

This and other goals are achieved, in accordance with the invention, by organic-inorganic hybrid nanofibres including two phases:

a first mineral phase comprising a structured mesoporous network with open porosity; and a second organic phase comprising an organic polymer, wherein said organic phase is not present inside the pores of the structured mesoporous network.

The second organic phase may essentially consist, or consist, of the said organic polymer, and may be called the polymeric organic phase.

Organic-inorganic hybrid nanofibres having the specific structure according to the invention, with a mesoporous, inorganic, mineral phase and an organic phase, have never been described in the prior art, where there is no mention of nanofibres in which the growth of mesoporous mineral networks, which are in particular conductive and/or hydrophilic, has been accomplished in a matrix comprising a mechanically structuring organic polymer.

The nanofibres according to the invention advantageously include a structured mesoporous network with open porosity oriented, aligned in a determined, preferred, particular direction, which is preferably the direction of the lengths of the nanofibres, which acts in favour of, and ensures, the continuity of the conducting paths, provided however an open porosity is present.

Open porosity is understood to mean a porosity formed of emerging, through, pores which as a consequence remain accessible to the conductive species.

This property of the nanofibres according to the invention is particularly advantageous in proton-conductive membranes.

According to a first embodiment of the material of the invention, the mineral phase and the organic phase are continuous and interwoven, entangled.

In other words, the inorganic, mineral phase and the organic phase, according to this first embodiment, form networks which are co-continuous with a controlled interface between the two networks.

In particular, the nanofibres may include a core consisting of the mineral phase surrounded by a sheath consisting of the organic phase.

According to a second embodiment, the mineral phase is discontinuous, and dispersed in the organic phase, which is continuous.

The mineral phase may have organic chemical functional groups which are preferably non-hydrolysable.

These organic chemical functional groups are generally bonded covalently to the mesoporous network, for example to the oxide network.

These organic chemical functional groups may preferably be chosen from among the conductive and/or hydrophilic functional groups.

These organic chemical functional groups may be located at any position in the mesoporous network. The organic chemical functional groups may thus be located at the surface of the pores, whilst being bonded covalently to the walls of the mesoporous network.

The presence of these functional groups in the mineral phase, the mesoporous network, is of great interest for many applications, in particular in the fields of catalysis, detection, and energy generation devices.

Hybrid nanofibres having organic chemical functional groups bonded in particular covalently to a mesoporous network, for example made of an oxide, are not known in the prior art, represented in particular by the documents cited above.

Similarly, the organic phase may have organic chemical functional groups which are preferably non-hydrolysable.

These organic chemical functional groups of the organic phase may preferably be chosen from among the conductive and/or hydrophilic functional groups.

The material may possibly include, in addition, a third phase within the pores constituted by at least one texturizing, structuring agent, such as a surfactant.

This texturizing, structuring agent may possibly have organic chemical functional groups, which are preferably non-hydrolysable, and preferably chosen from among the conductive and/or hydrophilic functional groups, but only if at least one of the other phases has conductive and/or hydrophilic functional groups.

Conductive functional groups is generally understood to mean that these functional groups have ionic conductivity, and preferably proton conductivity.

If it is desired to have a conductive material, and if this has three phases (organic, mineral, surfactant), at least one of the phases chosen from among the mineral phase and the organic phase must have conductive functional groups; it is also possible that any two of the three phases may have conductive functional groups, or that all three phases have conductive functional groups.

The nanofibres according to the invention generally have an open porosity, notably acting as a continuous proton-conductive network. The mesoporous backbone is preferably hygroscopic and has conductive functionality in its pores (it is for example a functionalised metal oxide), which thus ensures protons transport, and hydration. The organic polymer phase acts as a support, and principally provides the structuring of the conductive medium.

A real synergy occurs between the two phases which gives the nanofibres according to the invention a unique combination of chemical, physical, electrical and mechanical properties which have never been attained in the prior art.

It may be said that the nanofibres according to the invention have a hierarchization, prioritization of their properties, both chemical and mechanical, with different levels of organisation, which open up interesting prospects for electrochemical applications using complex systems and various properties.

In other words, the nanofibres according to the invention have a hierarchization, prioritization of their properties, and said nanofibres consist of a "multifunctional" material, having multiple properties, the various functions and properties of which are distributed at each dimensional scale of the material, namely the millimetric scale, the micron scale, the nanometric scale and the Angstrom scale.

The nanofibres according to the invention may thus have functionality, chemical properties, at the surface of the pores of the inorganic mesoporous network, i.e. at a nanometric scale, whereas the mechanical properties may instead be given to the fibres by the polymer at a millimetric scale, particularly if this polymer takes the form of a sheath surrounding a core formed by the inorganic phase.

The conductive groups may advantageously be chosen from among the cation exchange groups and/or the anion exchange groups.

The cation exchange groups may be chosen, for example, from among the following groups: $-SO_3M'$; $-PO_3M'_2$; $-COOM'$ and $-B(OM')_2$, where M' represents hydrogen, a monovalent metallic cation chosen, for example, from among $Li^+$, $Na^+$, $K^+$, or $-N^+R^4_3$ where each $R^4$ represents independently a hydrogen, an alkyl radical, having for example from 1 to 10 C, or an aryl radical, having for example from 6 to 10 C.

The anion exchange groups may be chosen, for example, from among the following groups: pyridyl; imidazolyl; pyrazolyl; triazolyl; the radicals of formula $-N^+R^6_3X'^-$, where X' represents an anion such as, for example, F, Cl, Br, I, $NO_3$, $SO_4H$, or $OR^7$, where $R^7$ is an alkyl radical, having for example from 1 to 10 C or an aryl radical, having for example from 6 to 10 C, and where each $R^6$ represents independently a hydrogen, an alkyl radical, having for example from 1 to 10 C, or an aryl radical, having for example from 6 to 10 C; and the aromatic or non-aromatic basic radicals containing at least one radical chosen from among the imidazole, vinylimidazole, pyrazole, oxazole, carbazole, indole, isoindole, dihydrooxazole, isooxazole, thiazole, benzothiazole, isothiazole, benzoimidazole, indazole, 4,5-dihydropyrazole, 1,2,3-oxadiazole, furazane, 1,2,3-thiadiazole, 1,2,4-thiadiazole, 1,2,3-benzotriazole, 1,2,4-triazole, tetrazole, pyrrole, aniline, pyrrolidine, and pyrazole radicals.

The nanofibres according to the invention may advantageously further include catalytic nanoparticles, preferably on at least one of their surfaces, and even more preferably on at least one of their external surfaces.

These catalytic nanoparticles may preferably be chosen from among the metallic nanoparticles and/or the metal oxide(s) nanoparticles.

These nanoparticles may consist entirely or partly of platinum, ruthenium, rhodium, gold, nickel, cobalt, or of a blend and/or of an alloy of these.

The mineral, inorganic phase generally consists of at least one oxide chosen from among the metal oxides, the oxides of metalloids and the mixed oxides of these.

The said oxide is generally chosen from among the oxides of silicon, titanium, zirconium, hafnium, aluminium, tantalum, tin, zinc, magnesium, rare earths or lanthanides such as europium, cerium, yttrium, lanthanum and gadolinium, and the mixed oxides of these.

The mineral phase of the material according to the invention is a mesostructured phase, meaning, more precisely, that the mesoporous network has an organised structure with repeating units.

For example, the mesoporous network may have a cubic, hexagonal, lamellar, vermicular, vesicular or bicontinuous structure.

The size of the pores of the mesoporous network is generally from 1 to 100 nm, and preferably from 2 to 50 nm.

The organic polymer of the organic phase must generally satisfy a number of conditions.

Before all else, the said polymer must generally be thermostable; by thermostable it is understood that it retains its properties under the action of heat.

The polymer must also, generally, not be sensitive to hydrolysis and to oxidation, in particular at high temperatures, notably at the operating temperatures of fuel cells, and for several thousand hours.

In addition, the chosen polymer must generally be:
  soluble in a hydro-alcoholic or alcoholic medium, or in the other water-miscible solvents, since the optional surfactant which is the texturizing agent of the mesoporous phase, and which becomes organised in a liquid medium, is done in strongly polar media such as water, alcohols, ethers, ketones, dimethylformamide, dimethylsulfoxide or N-methylpyrrolidone;
  plastic, in order to give the mesoporous inorganic phase sufficient flexibility, and to form a self-supporting film, i.e. the polymer may be qualified as a (mechanically) structuring polymer;
  this polymer must essentially not act as a texturizing agent capable of generating a mesoporosity.

The organic polymer will generally be chosen from among the polyether ketones (PEK, PEEK, PEEKK); the polysulfones (PSU), for example Udel®; the polyethersulfones, for example VITREX®; the polyphenyl ether sulfones (PPSU), for example Radel®; the styrene/ethylene (SES), styrene/butadiene (SBS) and styrene/isoprene (SIS), for example KRATON®, copolymers; the polyphenylenes, such as the poly(phenylene sulfides) and the poly(phenylene oxides); the polyimidazoles, such as the polybenzimidazoles (PBI); the polyimides (PI); the polyamideimides (PAI); the polyanilines; the polypyrroles; the polysulfonamides; the polypyrazoles, such as the polybenzopyrazoles; the polyoxazoles, such as the polybenzoxazoles; the polyethers, such as the poly(tetramethylene oxides) and the poly(hexamethylene oxides); the poly((meth)acrylic acids); the polyacrylamides; the polyvinyls, such as the poly(vinyl esters), for example the polyvinyl acetates, the polyvinyl formates, the polyvinyl propionates, the polyvinyl laurates, the polyvinyl palmitates, the polyvinyl stearates, the polyvinyl trimethylacetates, the polyvinyl chloroacetates, the polyvinyl trichloroacetates, the polyvinyl trifluoroacetates, the polyvinyl benzoates, the polyvinyl pivalates, the polyvinyl alcohols; the acetal resins, such as the polyvinyl butyrals; the polyvinyl pyridines; the polyvinyl pyrrolidones; the polyolefines, such as the polyethylenes, the polypropylenes, the polyisobutylenes; the poly(styrene oxides); the fluorinated resins and the polyperfluorocarbons, such as the polytetrafluoroethylenes (PTFE), for example TEFLON®; the poly(vinylidene fluorides) (PVDF); the polychlorotrifluoroethylenes (PCTFE); the polyhexafluoropropenes (HFP); the perfluoroalkoxides (PFA); the polyphosphazenes; the silicone elastomers; the block copolymers including at least one block consisting of a polymer chosen from among the above polymers.

When the material includes a third phase, inside the pores, this third phase may consist of a texturizing, structuring agent. This texturizing, structuring agent may be chosen from among the surfactants; these may be chosen from among: salts of alkyltrimethyl ammonium, alkylphosphates and alkylsulfonates; acids such as dibenzoyl tartric acid, maleic acid or the long-chain fatty acids; bases such as urea or the long-chain amines; phospholipids; doubly, twice, hydrophilic copolymers the amphiphilia of which is generated "in situ" by interaction with a substrate; amphiphilic multi-block copolymers including at least one hydrophobic block associated with at least one hydrophilic block. Among these polymers, one may cite, for example, Pluronic®s made of PEO(poly(ethylene oxide)) and PPO(poly(propylene oxide)) of the $(EO)_n-(PO)_m-(EO)_n$ type, copolymers of the $((EO)_n-(PO)_m)_x-NCH_2CH_2N-((EO)_n-(PO)_m)_x$ type (Tetronic®), the $C_n(EO)_m(OH)$ family ($C_n$=alkyl and/or aryl chain, EO=ethylene oxide chain), for example Brij®, Triton® or Igepal®, and the $(EO)_m$-sorbitan-$C_n$(Tween®) family.

It is important to note that the organic polymer of the organic phase must under no circumstances be confused with a possible surfactant polymer. Although both are then called "polymers", these compounds are different both in terms of their structures and their effects. The polymer of the organic phase is a polymer which plays a role of mechanical structuration of the entire hybrid material, whereas the optional surfactant polymer is qualified as a "texturizing" or "structuring" agent, in connection with the structuring and texturizing of the mesoporous network.

The invention also concerns a membrane comprising the nanofibres as described above, possibly deposited on a support.

A membrane is generally understood to mean that the material takes the form of a film or sheet of a thickness of, for example, 50 nm to several millimetres, and preferably 10 to 500 nm, and that in this membrane the fibres are generally bound and/or bonded (glued) and/or welded.

The invention also relates to an electrode comprising the nanofibres as described above.

The excellent properties of the nanofibres according to the invention, in the form of a membrane and/or an electrode, make them particularly suitable for use in an electrochemical device, for example a fuel cell.

The invention therefore also concerns a fuel cell comprising at least one membrane and/or one electrode as described above.

The invention also relates to a method for preparing organic-inorganic hybrid nanofibres as described above, in which the following successive steps are carried out:

a) at least one solution is prepared, in a solvent, of a mineral precursor A and/or an organometallic precursor C intended to constitute the mineral phase;

b) at least one structuring, texturizing agent D of the mesoporous mineral phase is added to the solution prepared in step a), whereby a solution S1 is obtained; and, optionally, said solution S1 is hydrolysed and left to age;

c) a solution S2 of an organic polymer E is prepared in a solvent;

d) simultaneous, separate electrically assisted extrusion of solution S1 and of solution S2 is carried out with a bicapillary electrically assisted extrusion device; or alternatively the electrically assisted extrusion of a mixture, optionally aged, of solution S1 and solution S2 is carried out with a monocapillary extrusion device; wherein said devices comprise at least one syringe containing the solution(s) connected to a needle to which a voltage is applied, and a manifold, collector, or support, whereby a deposit of organic-inorganic hybrid nanofibres is obtained on the manifold or support;

e1) heat treatment is carried out to consolidate the deposited nanofibres; or, alternatively, e2) heat treatment is carried out to eliminate the organic polymer E, the structuring, texturizing agent D, and optionally the support, by calcination;

f) optionally, on conclusion of step e1, the structuring, the texturizing agent D and/or the organic polymer E is/are totally or partially eliminated;

g) optionally, on conclusion of step e1) step e2) or step f) the support is separated or optionally eliminated.

It is clear that possible steps f) and g) may not be accomplished if the agent D, the organic polymer or the support have previously been eliminated.

Polymer E and structuring, texturizing agent D may be chosen from among the polymers and texturizing, structuring agents mentioned above in connection with the description of the nanofibres according to the invention.

It should be noted that structuring agent D or a solution of the latter in a solvent (preferably similar to the solvent of solution S1 and/or of solution S2) may optionally be added to solution S2 instead of being added to the solution prepared in step a), or alternatively structuring agent D or a solution of it in a solvent (preferably similar to the solvent of step a) and/or of solution S2) may be added both to the solution prepared in step a) (step b) is therefore then accomplished) and to solution S2.

Precursor A may advantageously be chosen from among the metal salts, the salts of metalloids, the metal alkoxides, and the alkoxides of metalloids. The metals and metalloids may be chosen from among the metals and metalloids mentioned above in connection with the description of the nanofibres according to the invention.

The polymer and/or structuring, texturizing agent D such as a surfactant agent D, are carriers of organic chemical functional groups such as conductive and/or hydrophilic functional groups, and/or precursor functional groups of these organic chemical functional groups, such as conductive and/or hydrophilic functional groups.

Advantageously, a chelating agent B, such as acetylacetone or acetic acid may be added to solution S1.

Organomineral precursor compound C is advantageously a compound carrying, on the one hand, organic chemical functional groups such as conductive and/or hydrophilic functional groups, or precursor functional groups of these organic chemical functional groups and, on the other hand, functional groups which may become bonded to the surface of the pores of the mesoporous network.

Solution S1, solution S2, or a blend of solutions S1 and S2, advantageously has a viscosity of 40 to 7,000 cps at 20° C.

The concentration in solution S1 of mineral precursor A and/or of organomineral precursor C and the concentration in solution S2 of polymer E, expressed as a dry extract, may be 15 to 60% by mass, and preferably 15 to 30% by mass.

The solvents of solutions S1 and S2 are advantageously solvents of low volatility, the vapour tension of which is lower than that of ethanol.

Solution S1 may advantageously be left to age at a temperature of 0° C. to 300° C., and preferably 20° C. to 200° C.; at a pressure of 100 Pa to $5 \cdot 10^6$ Pa, and preferably 1,000 Pa to $2 \cdot 10^5$ Pa; over a period of several minutes to several days, and preferably one hour to one week, and even more preferably 12 to 18 hours.

Prior to the electrically assisted extrusion, solution S1 and/or solution S2 may advantageously be preheated to a temperature of 40° C. to 80° C., and preferably 60° C. to 70° C.

The electrically assisted extrusion may advantageously be controlled by modifying one or more, and preferably all, of the following parameters:
the deposition temperature;
the relative humidity of the atmosphere in which the deposition is carried out;
the voltage applied to the needle;
the flow speed of the solutions or of the mixture in the syringe;
the distance between the needle and the manifold, collector, or support;
the atmosphere in which the deposition is carried out.

One or more of, and preferably all, these parameters may be chosen in accordance with the following:
Deposition temperature: 20° C. to 200° C., preferably 25° C. to 100° C., and even more preferably 30° C. to 70° C.;
Relative humidity of the atmosphere in which the deposition is carried out: 0 to 90%, preferably 5 to 90%, and even more preferably 5 to 60%;
Voltage applied to the needle; 2 to 25 kV, preferably 5 to 20 kV, and even more preferably 8 to 15 kV;
Flow speed of the solutions or of the mixture in the syringe: 0.1 to 20 mL/h, and preferably 0.1 to 10 mL/h;
Distance between the needle and the manifold or support: 2 to 25 cm, and preferably 10 to 18 cm;
Atmosphere in which the deposition is carried out: Air, Nitrogen or Argon.

Solution S1 and/or solution S2 advantageously include(s) catalytic nanoparticles, preferably metallic nanoparticles and/or nanoparticles of metal oxides.

A suspension of catalytic nanoparticles, preferably nanoparticles of metals and/or of metal oxides, may advantageously be spray-coated in the jet(s) coming out of the needle of the electrically assisted extrusion device.

The method also advantageously includes a final treatment step to release or generate organic chemical functional groups such as conductive and/or hydrophilic functional groups on the surface of the pores of the nanofibres.

As was stipulated above, the method according to the invention may be described as a method for preparing a membrane with a controllable porosity, consisting of nanofibres which contain at least one mesostructured inorganic structure, possibly with organic chemical functional groups bonded covalently to the inorganic network and imparting specific conductive and/or protonic properties; wherein these fibres are integrated in an organic polymer which gives the membrane other properties, such as mechanical, or hydrophobic/hydrophilic, properties.

The preparation of such a multifunctional membrane (i.e. one having several types of properties) with hierarchically organised properties presupposes a number of obstacles to be overcome to obtain two networks which are co-continuous with a controlled interface between the two networks.

According to the invention, these obstacles are overcome by:
controlling the rheology of the solutions which are formulated to be "electrospun", i.e. they generally have visco-elastic properties. The viscosity influences the morphology of the fibres obtained, and generally the viscosities used in the method according to the invention are very high, markedly higher than the viscosities of wet processes solutions such as the "dip-coating" method. These viscosities are generally greater than or equal to 40 cP, preferably 40 to 7,000 cP, and even more preferably 100 to 500 cP.

The state of polycondensation of the sol-gel solution, and the choice of the solvent, are then very important, and this is the reason why, according to the invention, low-volatility solvents, i.e. solvents the vapour tension of which is lower than or equal to that of ethanol, will preferably be chosen for solutions S1 and S2;

control of mesostructuration of the network, for example of the oxide network in the presence of the structuring, texturizing agent, with suitable conditions of growth by the sol-gel route of the functionalised mesoporous inorganic phase during the electrically assisted extrusion method;

control of the interface between the two phases, the inorganic phase and the organic polymer phase, with an inorganic solution which must have visco-elastic characteristics comparable to those observed in the polymers. These requirements may be met by controlling the kinetics of the hydrolysis and condensation reactions, by adjusting the pH, for example to a value within the range 1 to 7, and/or by optimising the ageing of the sol, for example by controlling the heating thereof.

control of the rate of ambient humidity, of the airflow which is preferably a laminar flow, and of the temperature of the system, with a control system independent of the temperature of the reactors and of the electrode in the electrically assisted extrusion device to control the inter-fibre porosity, in order to form, in a single step, dense electrolytic membranes for fuel cells or porous membrane structures for PEMFC catalytic supports.

According to the invention, one or more, and preferably all, of the parameters relative to the materials and to the method relating to the preparation of such nanofibres are controlled simultaneously. In its most advantageous embodiments the method according to the invention accomplishes a concomitant reaction control of the inorganic, organometallic precursors, in the presence of the catalysts and of organic polymers.

In other words, according to the invention, what might be called a multi-reagent synchronous control, associated with the regulation of the parameters of the method, is accomplished.

The invention will be better understood on reading the following description, given on an illustrative and non-restrictive basis, with reference to the attached illustrations, in which:

BRIEF DESCRIPTION OF THE ILLUSTRATIONS

FIG. 1A is a schematic view of a monocapillary electrically assisted extrusion device, comprising a single reactor containing a mixture of a solution A and a solution B, which is extruded;

FIG. 1B is a schematic sectional view of a fibre obtained with the device of FIG. 1A;

FIG. 2A is a schematic view of a bicapillary electrically assisted extrusion device, comprising a first reactor, containing a solution A, which is embedded in a second reactor, containing a solution B, where solutions A and B are extruded simultaneously, separately and independently through concentric apertures, to form a single hybrid fibre according to the invention (FIG. 2B);

FIG. 2B is a schematic sectional view of a hybrid fibre obtained with the device of FIG. 2A;

Figure 4A:
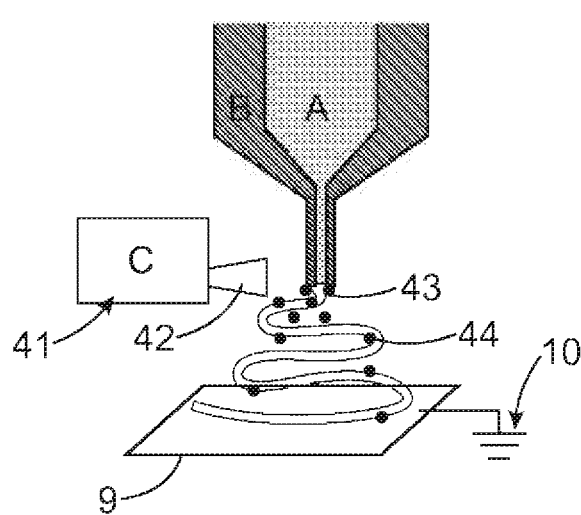
Figure 4B:
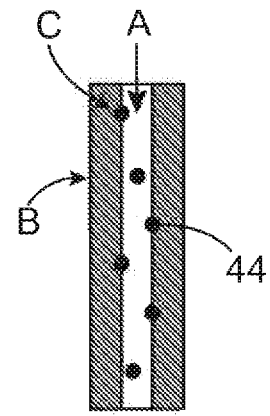
Figure 5:
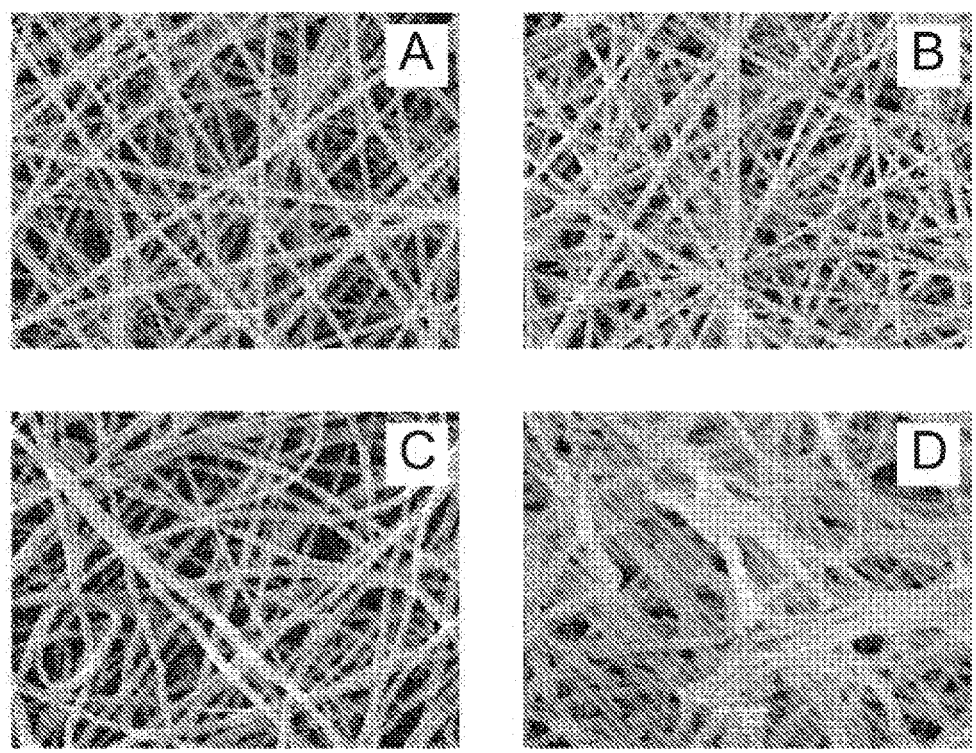

FIG. 4A is a schematic view of a bicapillary electrically assisted extrusion device, comprising a first reactor, containing a solution A, which is embedded in a second reactor, containing a solution B, wherein solutions A and B are extruded simultaneously and independently through concentric apertures, to form a single hybrid fibre; wherein the bicapillary electrically assisted extrusion device is coupled with a device for spraying a solution C;

FIG. 4B is a schematic sectional view of a fibre obtained with the device of FIG. 4A;

FIGS. 5A to 5D are images obtained by scanning electron microscopy of the hybrid fibres obtained in example 1 by the method according to the invention, where these fibres have been subjected to one of the following ageing heat treatments:

Heating at 70° C. for 12 hours (FIG. 5A); or alternatively
Heating at 130° C. for 4 hours (FIG. 5B); or alternatively
Heating at 70° C. and extraction of the surfactant by washing in ethanol (FIGS. 5C and 5D);
The scales represented in FIGS. 5A to 5D are 2 µm.

Figure 6:
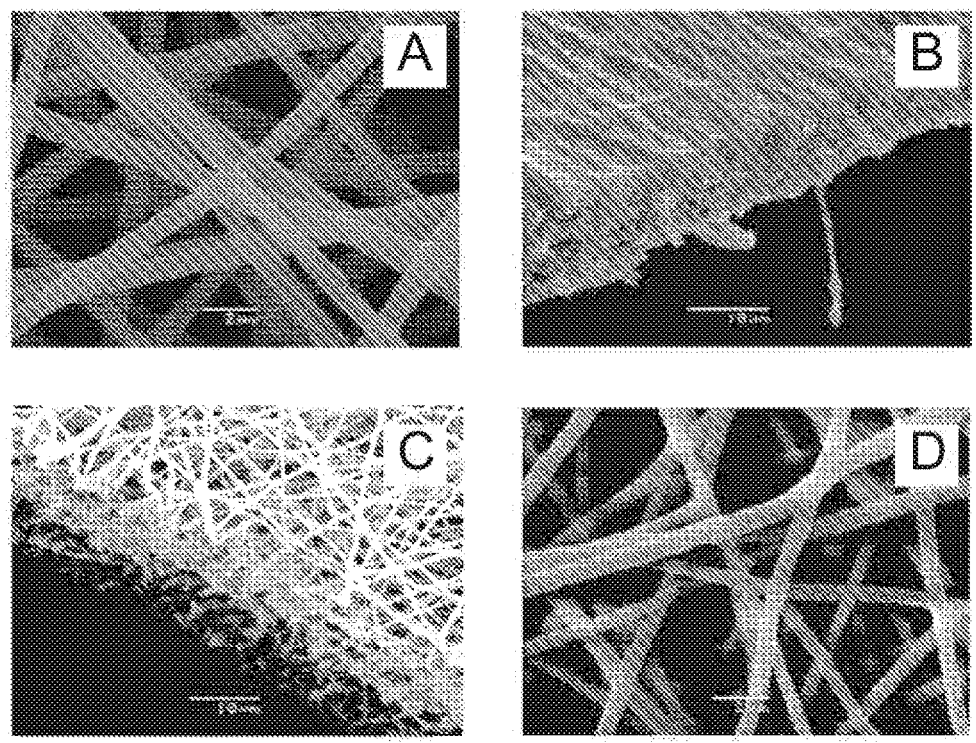

FIGS. 6A to 6D are images obtained by scanning electron microscopy (SEM) of the PEOS/PVDF-HFP hybrid membranes obtained in example 2 by the method according to the invention, comprising one of the following ageing heat treatments:

Ageing of the membrane at a temperature of 25° C. for one night (FIG. 6A); or alternatively
Ageing of the membrane at a temperature of 70° C. for one night (FIG. 6B); or alternatively
Ageing of the membrane at a temperature of 550° C. for one night (FIGS. 6C and 6D).
The scales shown in FIGS. 6A and 6D represent 2 µm, and the scales shown in FIGS. 6B and 6C represent 10 µm.

Figure 7A:
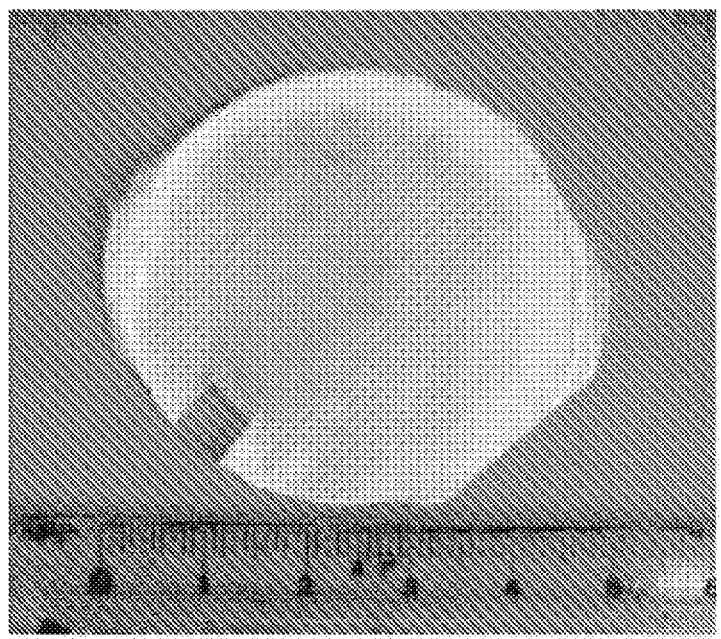

FIG. 7A is a photograph of an opaque membrane obtained in example 2 by the method according to the invention from solutions of PEOS/PVDF-HDP.

The scale shown in FIG. 7A is a rule graduated in centimetres.

Figure 7B:
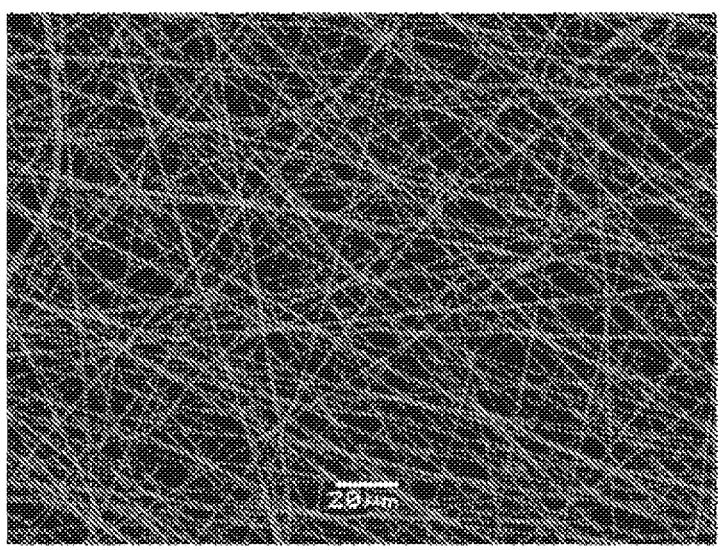

FIG. 7B is a SEM image of the opaque membrane of FIG. 7A.

The scale shown in FIG. 7B represents 20 µm.

DETAILED DESCRIPTION OF THE INVENTION

The following description is given principally in relation with the method for preparing nanofibres according to the invention.

In what follows, therefore, a description is given of a method of preparation, according to the invention, of nanofibres of a conductive organic-inorganic hybrid material having a polymeric organic phase and a mesoporous mineral phase, and also optionally a third surfactant phase.

It should be stipulated that nanofibres are generally understood to mean fibres which are 1 µm to 50 mm in length, and preferably 1 µm to 100 µm in length, and the largest dimension of the section of which, which is the diameter in the case of a circular section, is generally 10 to 500 nm, and preferably 10 to 100 nm.

This method firstly includes steps during which the various treatment solutions introduced into the reactor(s) of the electrically assisted extrusion system are prepared.

1.a Preparation of a Solution S1 of a Mineral, Inorganic Precursor A.

Synthesis of the material according to the invention starts with the preparation of a solution S1 of at least one mineral, inorganic, precursor A and/or at least one organometallic precursor compound C which will constitute the architecture of the mineral mesoporous network.

Precursor A may be chosen from among the metal salts, the salts of metalloids, the metal alkoxides, and the alkoxides of metalloids.

In particular, precursor A may be chosen from among the salts and alkoxides of metalloids, the salts and alkoxides of transition metals, and the salts and alkoxides of lanthanides, such as the salts and alkoxides of silicon, titanium, zirconium, hafnium, aluminium, tantalum, tin, europium, cerium, zinc, magnesium, yttrium, lanthanum and gadolinium.

This precursor A is diluted in a solvent or a mixture of solvents. The choice of this solvent or of this mixture of solvents is generally made according to the visco-elastic properties imposed by the electrically assisted extrusion method carried out according to the invention, and in accordance with the miscibility medium of the polymer which is subsequently used.

The solvent or solvents is (are) generally chosen from among the low-volatility solvents. Low-volatility is understood to mean that this or these solvent(s) generally have a vapour tension lower than that of ethanol.

The solvent or solvents is (are) typically chosen from among the alcohols, the amides, the ethers, the aldehydes and the ketones which are water-miscible or partially water-miscible and which have a low volatility. Preferred solvents are THF, DMF, NMP, MEK, and dioxane.

Precursor organometallic compound C is generally a compound having hydroxyl functional groups or hydrolysable functional groups of the alkoxide type, and non-hydrolysable or grafted functional groups.

It should be noted that an organometallic compound is understood to mean compounds comprising a metal but also compounds including a metalloid.

Organometallic compound C may, for example, satisfy the formula $R^1_x R^2_y MOR^3_{(n-(x+y))}$, or the formula $ZR^1_x ZR^2_y M'OR^3_{(n-(x+y))}$, in which M and M' represent a metalloid or a metal such as a transition metal or a lanthanide.

M and M' may, for example, be chosen from among silicon, titanium, zirconium, hafnium, aluminium, tantalum, tin, europium, cerium, zinc, magnesium, yttrium, lanthanum and gadolinium.

n is the degree of valency of the metal, generally n may range from 1 to 10.

X and Y may generally range from 0 to 1 and 10.

Z is a complexing functional group of the monodentate type, such as an acetate, phosphonate or phosphate functional group, or a functional group of the bidentate type chosen, for example, among the β-diketones and their derivatives, and the α- or β-hydroxyacids.

In both these formulae, $R^1$, $R^2$, and $R^3$ are organic substituents chosen, for example, from among H, the alkyl groups, notably having from 1 to 10 C, and the aryl groups, notably having from 6 to 10 C.

One or more among substituents $R^1$, $R^2$, and $R^3$ may include one or more cation exchange groups, such as groups —$SO_3M''$, —$PO_3M''_2$, —COOM'', or —$B(OM'')_2$, in which M' represents H, a monovalent metallic cation chosen, for example, from among lithium, sodium or potassium, or a —$N^+R^4_3$ group, where each $R^4$ independently represents H, an alkyl group, notably having from 1 to 10 C, or an aryl group notably having from 6 to 10 C; or one or more precursor group(s) of cation exchange group(s) such as groups $SO_2X$, COX, or $PO_3X_2$, where X represents F, Cl, Br, I or $OR^5$, where $R^5$ represents an alkyl group notably having from 1 to 10 C, or an aryl group notably having from 6 to 10 C; or one or more anion exchange group(s) such as groups —$^+NR^6_3X'^-$, where X' represents an anion such as, for example, F, Cl, Br, I, $NO_3$, $SO_4H$ or $OR^7$, where $R^7$ represents an alkyl group notably having from 1 to 10 C, or an aryl group notably having from 6 to 10 C, and where each $R^6$ independently represents H, an alkyl group notably having from 1 to 10 C, or an aryl group notably having from 6 to 10 C, or —$^+NR^8X'$ groups, where X' is as defined above and $R^8$ is a group which forms with nitrogen $^+N$ a cycle of 4 to 10 links including carbon and nitrogen atoms such as an imidazolinium, pyridinium or pyrazolium cycle.

Preferred cation exchange groups are the —$SO_3M'$ groups and the —$PO_3M''_2$ groups and precursor groups of preferred cation exchange groups are the —$SO_2X$ or —$PO_3X$ groups.

A preferred anion exchange group is the imidazolinium group.

Solution S1 may include only one or several precursor(s) A, or alternatively solution S1 may include only one or several precursor(s) C, or alternatively solution S1 may include one or several precursor(s) A and one or several precursor(s) C.

One may thus commence by preparing a solution of the (purely) metallic precursor(s) A, and add to this solution a molar fraction of precursor(s) C.

Or, alternatively, precursor(s) C may be added to the solvent or solvents at the same time as the (purely) metallic precursor(s) A.

When solution S1 contains both one or more metallic precursor(s) A and one or more organometallic precursor(s) C, the metal or metalloid of precursor A and the metal or metalloid of precursor C are chosen such that they are identical.

The concentration of precursor A or the concentration of precursor C or the total concentration of precursor A and of precursor C in solution S1 is generally 1 to 40%, and preferably 1.5 to 30%, by mass. It should be noted that the concentrations are generally 15 to 320 times higher than the concentrations used in the conventional methods such as deposition by "dip coating".

Structuring, texturizing agent(s) D is (are) added to the solution containing precursor(s) A and precursor(s) C.

The choice of the structuring, texturizing agent depends at once on the desired mesostructure, for example cubic, hexagonal, lamellar, vesicular or vermicular, on the size of the pores and of the walls of this mesostructure, and on its solubilisation in the solvent used for the other compounds of the present invention, namely the polymer, the precursor or precursors A, and/or precursor or precursors C.

Surfactant texturizing agents of the ionic type will generally be used, such as the salts of alkyltrimethyl ammonium, for example cetyltrimethylammonium bromide or the salts of alkylphosphates and alkylsulfonates; or acids such as dibenzoyl tartric acid, maleic acid, and the long-chain fatty acids; or bases such as urea and the alkyl amines with a long chain, to build mesoporous structures the size of the pores of which is limited, for example, to one or several nanometres, for example 1.6 to 10 nm, and the size of the walls of which is also limited to one or several nanometres, for example 1 nm to 20 nm, notably approximately 1 nm.

It is also possible to use lyotropic phases consisting of amphiphilic multi-block copolymers comprising at least one hydrophobic block associated with at least one hydrophilic block typically such as the Pluronic®s, for example Pluronic® F 123 or Pluronic® F 127, based on PEO (polyethylene oxide) and PPO (polypropylene oxide) of the $(EO)_n$—$(PO)_m$-$(EO)_n$ type, copolymers of the $((EO)_n$—$(PO)_m)_x$—$NCH_2CH_2N$—$((EO)_n$—$(PO)_m)_x$ (Tetronic®) type, the compounds of formula $C_n(EO)_m(OH)$ (where $C_n$ is an alkyl and/or aryl chain, having for example from 1 to 20 C, and preferably from 6 to 20 C, where EO is ethylene oxide, and where m is an integer, for example from 10 to 200, for example the Brij®, Triton®, Tergitol® or Igepal® compounds, and the compounds of formula $(EO)_m$-sorbitan-$C_n$ (Tween®) to prepare mesoporous phases of larger pore sizes, for example as high as 50 nm.

These different blocks may also be of an acrylic nature: PMAc (poly(methacrylic acid) or PAAc (poly(acrylic acid), an aromatic nature: PS (Polystyrene), a vinylic nature: PQVP (polyvinylpyridine), PVP (polyvinylpyrrolidone), PVEE (polyvinylether), or another: PDMS (polysiloxane).

These different blocks may be functionalised by one or more conductive group(s) of the cation exchange type; or one or more precursor group(s) of cation exchange group(s); or one or more anion exchange group(s); or one or more precursor group(s) of anion exchange group(s). These groups may notably be chosen from among the previously listed groups. PSS (poly(styrenesulfonic acid)) may be mentioned, for example.

The chosen structuring agent(s) D may be added directly to the solution containing precursor(s) A and precursor(s) C, or alternatively agent(s) D may be previously dissolved or diluted in a hydro-alcoholic medium, or in a water-based solvent mixture compatible with the dilution medium of the polymer and of the metallic precursor.

The concentration of the structuring agent(s) D in solution S1 is generally 1 to 20% by mass.

Solution S1 may or may not be hydrolysed, for example in an acid or base catalytic medium, for a determined period which may be from one to several minutes up to one or more hours (2, 6, 12, 18, 24, 48 hours), for example 12 to 18 hours, depending on the choice of metallic precursor.

Notably in the case of the highly reactive metallic precursors, such as zirconium-based or titanium-based precursors, a chelating agent B, such as acetylacetone, acetic acid or the phosphonates, may be introduced to control the hydrolysis-condensation of the inorganic network.

1.b Preparation of Solution S2 of at Least One Organic Polymer E.

Organic polymer E is generally chosen for its mechanical properties, its chemical stability and/or its non-miscibility in the treating solution S1.

This polymer is diluted or swollen with a solvent or mixture of solvents, preferably chosen from among the alcohols, ethers, amides, aldehydes and ketones which are water-miscible or partially water-miscible.

The organic polymer(s) will generally be chosen from among the polyether ketones (PEK, PEEK, PEEKK); the polysulfones (PSU), for example Udel®; the polyethersulfones, for example VITREX®; the polyphenyl ether sulfones (PPSU), for example Radel®; the styrene/ethylene (SES), styrene/butadiene (SBS) and styrene/isoprene (SIS), for example KRATON®, copolymers; the polyphenylenes, such as the poly(phenylene sulfides) and the poly(phenylene oxides); the polyimidazoles, such as the polybenzimidazoles (PBI); the polyimides (PI); the polyamideimides (PAI); the polyanilines; the polypyrroles; the polysulfonamides; the polypyrazoles, such as the polybenzopyrazoles; the polyoxazoles, such as the polybenzoxazoles; the polyethers, such as the poly(tetramethylene oxides) and the poly(hexamethylene oxides); the poly((meth)acrylic acids); the polyacrylamides; the polyvinyls, such as the poly(vinyl esters), for example the polyvinyl acetates, the polyvinyl formates, the polyvinyl propionates, the polyvinyl laurates, the polyvinyl palmitates, the polyvinyl stearates, the polyvinyl trimethylacetates, the polyvinyl chloroacetates, the polyvinyl trichloroacetates, the polyvinyl trifluoroacetates, the polyvinyl benzoates, the polyvinyl pivalates, the polyvinyl alcohols; the acetal resins, such as the polyvinyl butyrals; the polyvinyl pyridines; the polyvinyl pyrrolidones; the polyolefines, such as the polyethylenes, the polypropylenes, the polyisobutylenes; the poly(styrene oxides); the fluorinated resins and the polyperfluorocarbons, such as the polytetrafluoroethylenes (PTFE), for example TEFLON®; the poly(vinylidene fluorides) (PVDF); the polychlorotrifluoroethylenes (PCTFE); the polyhexafluoropropenes (HFP); the perfluoroalkoxides (PFA); the polyphosphazenes; the silicone elastomers; the block copolymers including at least one block consisting of a polymer chosen from among the above polymers.

These different polymers may include one or more conductive group(s) of the cation exchange type; or one or more precursor group(s) of cation exchange group(s); or one or more anion exchange group(s); or one or more precursor group(s) of anion exchange group(s). These groups may notably be chosen from among the previously listed groups.

The concentration of the organic polymer(s) in solution S2 is generally 1 to 50%, and preferably 1 to 30%.

1.d Preparation of the Surfacted Organic-Inorganic Hybrid Solution F

Surfactant-based precursor solution D is added at ambient temperature to polymer solution E. After homogenisation of the medium the precursor solution made, based on an inorganic component, compound, A including a molar fraction X of C (for example 0≤x≤0.4) is added drop wise at ambient temperature to the reactive medium. Stirring at a controlled temperature between ambient temperature and reflux temperature is maintained for several hours. This ageing of the organic-inorganic hybrid solution may last for several days, depending on the choice of the polymer and of the inorganic network. The composition of the formulation is generally $[A_{(1-X)}\text{-}C_X]\text{-}D_Y\text{-}E_Z\text{-}(H_2O)_h$ where $$Y=\text{mol}(D)/[\text{mol}[A_{(1-X)}\text{-}C_X]]+\text{mol}(D) \text{ and } 0\leq Y\leq 0.2$$
$$\text{and where } Z=g(E)/[g(MO_2)+g(E)] \text{ and } 0\leq Z\leq 0.9.$$

2. Preparation of Organic-Inorganic Hybrid Nanofibres

In accordance with the invention, solution S1 and solution S2 are deposited on a support by carrying out the simultaneous and separate electrically assisted extrusion of solution S1 and of solution S2 with a bicapillary electrically assisted extrusion device; or alternatively by carrying out the electrically assisted extrusion of a mixture of solution S1 and of solution S2 with a monocapillary electrically assisted extrusion device.

The monocapillary electrically assisted extrusion device comprises a reactor or syringe containing the solution to be extruded, connected to a metal needle. Such a device is well known to the man skilled in the art in this technical field, and is represented in FIG. 1A.

It should be stipulated that in the figures references A, B and C designate, in respect of the devices (FIGS. 1A, 2A, 3A, 4A), respectively solutions S1, S2 and S3, and in respect of the fibres, respectively phases A, B, C, obtained from these solutions.

The reactor or syringe (1) generally takes the form of a vertical cylindrical tank (2) of circular section, and with an open upper end which contains the solution to be extruded (3). The lower end of the tank has the shape of a truncated cone (4) converging towards a lower aperture of generally circular section (5) which is continued by a hollow tube or needle (6).

A piston exerts a pressure on the upper surface (7) of the solution (3) contained in the syringe or reactor (1), by means of which the solution is expelled (8) through the aperture located at the end of the needle (6).

The needle (6) is powered by a high voltage, and an electrical field is thus created between the needle (6) of the syringe and a substrate called the manifold (9), which acts as a counter electrode, and which is generally connected to earth (grounded) (10). The manifold (9) may be made of a conductive or semiconductive material. The manifold (9) may have a variety of shapes and sizes. The manifold (9) may thus be cylindrical, flat or circular. The manifold may be static, fixed, or may be dynamic, and be subjected to a rotary or lateral motion. The needle (6) may be positioned at an angle Θ, generally 0° to 45°, relative to the manifold (9).

If the method according to the invention is accomplished with a monocapillary extrusion device such as the one represented in FIG. 1, the reactor, syringe of the device contains a mixture (3) of solutions S1 and S2 defined above, in which polymer E and precursors A and/or C are uniformly distributed at the molecular level before the extrusion, and it is therefore this mixture which is subjected to the electrically assisted extrusion.

By this means, when a monocapillary extrusion device is used, composite fibres represented in FIG. 1B are obtained including a polymer matrix (11, phase B), in which the mesoporous, mineral, inorganic phase (phase A) is discretely distributed.

The bicapillary electrically assisted extrusion reactor (21) represented in FIG. 2A, comprises two embedded reactors or syringes, for example a first reactor or syringe may consist of a first vertical cylinder of circular section as described above, and the second reactor may consist of the space (23) defined between the walls (22) of this first reactor and the walls (24) of a cylinder of larger diameter surrounding the first cylinder. The lower end of the first reactor has the shape of a truncated cone (25) converging towards a lower aperture of generally circular section (26) which is continued by a hollow tube (27). The lower end of the wall of the second reactor also has the shape of a converging truncated cone (28) surrounding the truncated cone (25) and terminating with a tubular wall surrounding the hollow tube (27).

In the bicapillary electrically assisted extrusion reactor, the needle therefore comprises a central hollow tube (27) through which the solution (29) contained in the first reactor is expelled, and this central hollow tube of generally circular section (27) is surrounded by an annular tube (210) which is concentric to the first central hollow tube (27), through which the solution (211) contained in the second reactor is expelled, simultaneously and separately from the first solution.

If the method according to the invention is accomplished with a bicapillary extrusion device such as the one represented in FIG. 1B, solution S1 (A) is generally contained in the first reactor, whereas solution S2 (B) is generally contained in the second reactor. The two solutions S1 and S2 are extruded independently, separately and simultaneously, respectively through the first central aperture of the needle, and through the second concentric, annular aperture of the needle.

By this means, when a bicapillary electrically assisted extrusion device is used, hybrid fibres represented in FIG. 2B are obtained in which a core (212) made of a mesoporous mineral phase (phase A) is surrounded by a concentric casing, sheath, shell or sleeve (213) made of an organic polymer (phase B).

Extrusion of the two solutions S1 and S2 is separate and independent, but simultaneous. Due to the fact that both these solutions are extruded through concentric apertures, this does not result in the formation firstly of a fibre from solution S1 and secondly of a fibre from solution S2, but instead in the formation of a single, hybrid, unitary fibre, having the structure described above and in FIG. 2B.

The man skilled in the art concerning the structure of a bicapillary assisted extrusion device is aware that when such a device is used, two types of fibre are not obtained simultaneously, but instead a single type of fibre is obtained.

Figure 3A:
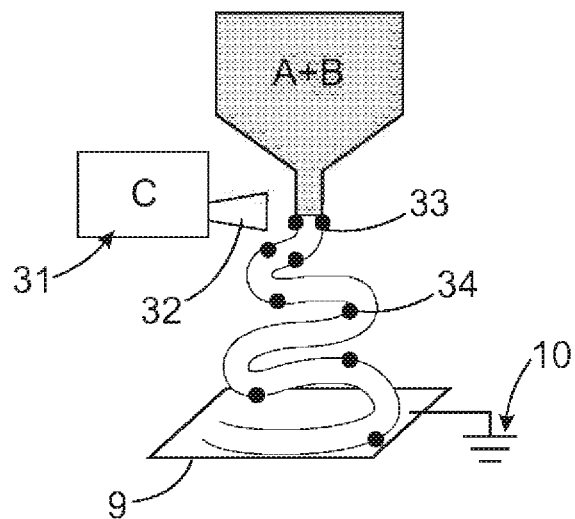
FIG. 3A is a schematic view of a monocapillary electrically assisted extrusion device, comprising a single reactor containing a mixture of a solution A and of a solution B, which is extruded; wherein the monocapillary electrically assisted extrusion device is coupled to a device for spraying a solution C.

The electrically assisted extrusion device used according to the invention, whether it is a monocapillary or bicapillary device, may possibly be coupled with a spray-coating device (31, 41) as is represented in FIGS. 3A) and (4A).

This spray-coating device is generally positioned such that it sprays a solution S3, through a nozzle (32, 42), in the form of an aerosol or nebulisate in the jet (33, 43) coming out of the needle of the electrically assisted extrusion device, preferably in the vicinity of the aperture or apertures of the needle of the electrically assisted extrusion device.

This solution, or rather suspension, S3 is generally a solution, or rather suspension, of nanoparticles (34, 44) of metals and/or metal oxides (phase C). These metals may be chosen from among gold, silver, platinum, palladium, nickel, copper, ruthenium, rhodium and cobalt.

Figure 3B:
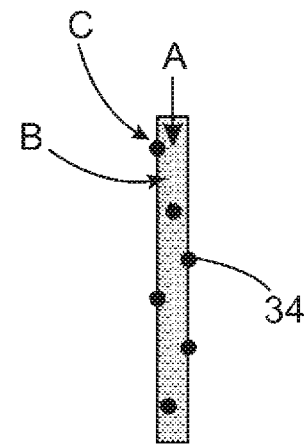
FIG. 3B is a schematic sectional view of a fibre obtained with the device of FIG. 3A.

By this means nanofibres are obtained having a structure similar to that of the hybrid fibres prepared with an electrically assisted extrusion device which are represented in FIGS. 1B and 2B but which, in addition, are "decorated" by nanoparticles (34, 44) of metals and/or metal oxides. These nanofibres are represented in FIGS. 3B and 4B.

It should be noted that if one or both solution(s) S1 or S2 also contains nanoparticles of metals and/or metal oxides, these nanoparticles may be found distributed throughout phase A or phase B, or throughout both phases. In this case, it is also possible, in addition, to spray a solution S3, as described above.

In the method according to the invention, a multi-reagent synchronous control is accomplished, i.e. the sol-gel hydrolysis-condensation reactions, corresponding to a kinetic control, the mesoporous organisation of the networks, corresponding to a thermodynamic control, and the rheology of the mixture, allowing electrically assisted extrusion of the mixture, are controlled simultaneously.

These different controls may be achieved by adjusting the parameters relating to the solution or solutions to be deposited defined above, and the parameters relating to the electrically assisted extrusion method itself.

Thus, with regard to the parameters relating to the extrusion method, the electrically assisted extrusion temperature is generally regulated independently of the reactors and of the manifold, and is generally within the range from 20° C. to 200° C., preferably from 25° C. to 100° C., and even more preferably from 30° C. to 70° C.

The relative humidity of the extrusion device is regulated within a range of 0 to 90%, preferably 5 to 90%, and even more preferably 5 to 60%.

The voltage applied to the needle is generally within a range of 2 to 25 kV, preferably 5 to 20 kV, and even more preferably 8 to 15 kV.

The flow speed of the solutions in the syringe is generally within a range of 0.1 to 20 mL/h, and preferably 0.1 to 10 mL/h.

The distance between the needle (i.e. generally the tip or end of the needle) and the counter electrode (manifold or support) is generally 2 to 25 cm, and preferably 10 to 18 cm.

Deposition may be accomplished in an atmosphere of air, nitrogen or argon.

Adjustment of the applied voltage, of the ejection flow rate of the solution (equivalent to the flow speed in the syringe), and of the distance between the needle and the manifold, enables the diameter of the fibres and their texturizing to be controlled.

Continuous controlled application of the voltage will be preferred to form fibres which are of uniform diameter, whereas isolated and controlled variations of the voltage will enable faults to be created in the texturizing of the fibres, and the growth of a three-dimensional fibrous network to be favoured.

The fibres deposited on the substrate or support constituted by the manifold are then generally heat-treated at a temperature of between 50° C. and 300° C., and preferably between 40° C. and 200° C., depending on the nature of the polymer, generally to obtain consolidation. This treatment may be called an ageing treatment and, depending on the conditions that are used, enables a cohesive membrane to be obtained in which the fibres are generally bonded, glued, to one another.

The duration of this consolidation treatment is generally 15 minutes to 24 hours, and preferably 1 to 15 hours.

Or, alternatively, the heat treatment may be a calcination heat treatment during which the structuring agent D, organic polymer E, and optionally the support, are eliminated. This treatment is accomplished at a temperature higher than the ageing or consolidation treatment described above, for example at a temperature of over 300° C., and preferably 550° C. On completion of this treatment mineral fibres which now comprise only the mesoporous mineral phase are obtained. These nanofibres may optionally take the form of a membrane, or of a fabric of nanofibres of mineral phase, for example of silica.

If the structuring agent has not been eliminated, and a consolidation, not a calcination, has been accomplished, then the texturizing, structuring agent such as a surfactant which was used for the mesostructuration of the inorganic network, and which is in the mesopores of the membrane, may possibly be eliminated completely or partially, preferably by a mild method such as, for example, washing, whether selective or not, in a solvent such as ethanol.

The washing may be accomplished in an acidic hydro-alcoholic medium.

A post-reaction to release or generate a conductive group bonded to the inorganic network may be accomplished. Typically, this type of post-reaction may be:
  oxidation of a mercaptan group (—SH) by hydrogen peroxide into sulfonic acid $SO_3H$ or,
  hydrolysis of a dialkylphosphonate $(RO)_2(O)P$— group by HCl directly, or through the formation of an intermediate compound $(Me_3SiO)_2(O)P$—, followed by hydrolysis by MeOH to form a phosphonic acid —$PO_3H_2$.

This post-reaction may also be a grafting of surface M-OH hydroxyls of the inorganic network of the membrane by a metal organo-alkoxide. In all these cases the membrane is placed in a liquid medium to allow it to swell, and to allow the reactive molecular entities to diffuse in the pores of the membrane.

In order to prevent any parasitic reaction within the membrane during operation of the cell the membrane such as a proton conductive membrane may be purified by different washings, for example oxidising, acidic (or basic) and aqueous washings, which enable all the labile organic, organomineral or inorganic entities to be eliminated.

The membrane may also be prepared in the form of a self-supporting film. This shaped film is then separated from its support by swelling in a solvent such as water.

The invention will now be described with reference to the following illustrating and non-restricting examples.

EXAMPLES

Example 1

In this example, hybrid fibres of zirconium oxide and of a PVDF-HFP copolymer are prepared.

0.52 g of the surfactant Pluronic® F127, and 0.466 g of a PVDF-HFP copolymer (poly(vinylidene fluoride co-hexafluoropropene)), the mass percent of the hexafluoropropene chain is between 5 and 12%) is added to 0.65 g of acetic acid (a chelating agent), 4.0 g of a zirconium precursor, $Zr(OiPr)_4$ and 4.8 g of DMF.

The solution is stirred over night in order to dissolve the $ZrO_2$ precipitates which may be formed due to the presence of residual water.

This solution (viscosity: 20 cPs, mass percent of the polymer: 4.4%, mass percent of the zirconium precursor: 38%) is used to prepare hybrid fibres of Pluronic® F127/$ZrO_2$/PVDF-HFP by monocapillary electrically assisted extrusion.

The experimental conditions to obtain these fibres are as follows:
  a voltage of 15 kV between the needle and the counter electrode,
  a flow rate of 0.4 mL/h,
  30% humidity,
  a temperature of 27° C. in the reactive medium (i.e. in the solution),
  a distance of 11 cm between the end of the needle and the counter electrode.

The hybrid fibres obtained are subjected to one of the following ageing heat treatments:
  Heating at 70° C. for 12 hours (FIG. 5A); or alternatively
  Heating at 130° C. for 4 hours (FIG. 5B); or alternatively
  Heating at 70° C. and extraction of the surfactant by washing in ethanol (FIGS. 5C and 5D).

FIGS. 5A, 5B, 5C, 5D are images obtained by scanning electron microscopy (SEM) of the fibres of Pluronic® F127/$ZrO_2$/PVDF-HFP obtained by electrically assisted extrusion from the solution prepared in the manner described above, where these fibres have also been subjected to one of the heat treatments described above.

The diameter of the fibres obtained is approximately 260 nm±50 nm. They are of uniform diameter. Depending on the applied heat treatment, they may have a particular geometry in the form of a vertebral column, backbone (FIG. 5D).

Example 2

In this example, PEOS/PVDF-HFP hybrid fibres are prepared which may take the form of a membrane.

The PEOS polysiloxanes are previously synthesised (water, TEOS and acid) by hydrolysis of the TEOS in an acidic medium in ethanol.

The three constituents are mixed in the following proportions: $H_2O/Si=1.7$ and pH=2.5, in a sealed flask, and they are then stirred for 3 days at 70° C.

The solvent is evaporated from the previous solution using a "rotavapour".

The solution obtained in this manner is transparent, viscous (1,000 cPs) and is dried in a vacuum at ambient temperature to obtain a white powder.

The solution subjected to the electrically assisted extrusion is then prepared as follows: the white powder prepared above is dissolved in a THF/DMF mixture (50/50 by mass). The copolymer (PVDF-HFP) (4.4% by mass) and the surfactant (Pluronic® F127, 15.9%) are then added to this solution.

This solution of high viscosity (100 cPs) is subjected to the electrically assisted extrusion.

The solution subjected to the electrically assisted extrusion has the following composition: 450 mg of Pluronic® F127; 125 mg of PVDF-HFP; 750 mg of PEOS prepared with a $H_2O/Si$ molar ratio of 1.7; 1.5 g of DMF; its viscosity is 100 cPs.

The electrically assisted extrusion is accomplished at a voltage of 11 kV, with a flow rate of 0.5 mL/h, at ambient temperature, and with relative humidity ("RH") of approximately 70% RH.

The distance between the end of the needle and the counter electrode is 13 cm. The membrane is obtained after an extrusion time of 30 minutes.

The membranes obtained are then subjected to one of the following ageing heat treatments:

Ageing of the membrane at a temperature of 25° C. for one night; or alternatively Ageing of the membrane at a temperature of 70° C. for one night; or alternatively Ageing of the membrane at a temperature of 550° C. (for 2 hours to one night).

FIGS. 6A, 6B, 6C and 6D have images obtained by scanning electron microscopy (SEM) of the PEOS/PVDF-HFP hybrid membranes obtained by electrically assisted extrusion from the solution prepared in the manner described above, wherein these membranes have also been subjected to one of the heat treatments described above.

The morphology of the membrane depends on its ageing temperature after synthesis. Treatment at ambient temperature (25° C.) over night leads to the formation of individual fibres, although they may however be considered to form a membrane fabric, which is an element of interest for the electrode portion, with a diameter of approximately 1 µm (FIG. 6A).

Conversely, treatment of these fibres at 70° C. over night leads to the formation of a membrane with fibres bonded, glued, to one another (FIG. 6B).

Finally, during the treatment of these fibres at 550° C. the polymer is eliminated, and a fabric of silica fibres is obtained (FIGS. 6C and 6D).

The opaque membrane of FIGS. 7A and 7B was obtained under the conditions previously described above: ageing at ambient temperature, humidity: 70%, needle-counter electrode distance: 13 cm, extrusion time: 30 minutes, voltage: 11 kV Example 3

In this example, membranes based on CSPTMS (chlorosulfonylphenyltrimethoxysilane)/PVDF-HFP/PEO are prepared.

CSPTMS is a bifunctional compound of the organometallic type, as defined above.

Polyoxyethylene (POE) is used as a structuring agent.

Polyoxyethylenes of various molecular weights (10,000; 1,000,000; 16,000) are added to solutions containing the CSPTMS/PVDF-HFP mixture in order to obtain 50% by mass of PVDF-HFP (poly(vinylidene fluoride co-hexafluoropropene)), and the mass percent of the hexafluoropropene chain is between 5 and 12%).

The different solutions are extruded at a voltage of 12.4 kV, with a distance between the end of the needle and the counter electrode of 10 to 11 cm, a variable humidity rate ranging from 0 to 20% RH, and with a flow rate of 0.15-0.3 ml/h, at ambient temperature, for one hour.

The membranes obtained are flexible and opaque, and approximately 20 µm thick. The thickness is principally regulated by the time during which the solution is spray-coated, whatever the PEO may be.

4-points conductivity measurements were made on these membranes.

In the case of the membrane prepared from polyethylene glycol of molecular weight 10,000, the measured proton conductivities are 100 mS/cm at 80° C. under 100 kPa, whereas the conductivity is 43 mS/cm for a membrane prepared with a poly(ethylene oxide) of molecular weight 1,000,000.

The fibres and membranes of the examples have a mineral phase with a structured mesoporous network with open porosity, which is as defined in the description given above, notably in respect of the size of the pores. The size of the pores was characterised by Transmission Electron Microscopy (TEM) and/or by X-ray diffraction (DRX at low angles) and/or by gas adsorption (BET).

The mesostructure is characterised by X-rays diffraction (DRX) at low angles.

The measurements made on the fibres and membranes of the examples give values for the size of the pores of the mineral phase in accordance with those given in the description.

The diffractograms produced for the fibres and membranes of the examples show that mesostructuration of the mineral phase is present.

REFERENCES

[1] a) S.-S. Choi, S. G. Lee, S. S. Inn, S M. Kim, *J. Mater. Sci Lett.* 2003, 22, 891.
b) W. Kataphinan, R. Teye-Mensah, E. A. Evans, RiD. Ramsier, D. H. Reneker, D. J. Smith, J *Vac. Sci Technol, A* 2003, 21 1574.

[2] G. Larsen, R. Velarde-Ortiz, K. Minchow, A. Barrero, I. G. Loscertales, *J. Am. Chem. Soc.* 2003, 125, 1154.

[3] a) Y. Wang, R. Furlan, I. Ramos, J. I. Santigano-Aviles, *Appl Phys. A* 2004 78, 1043.
b) Y. Wang, J. J. Santigano-Aviles, *Nanotechnology* 2004, 15, 32.

[4] a) S. Madhugiri, W. Zhou, J. P. Ferraris, K. J. Balkus, Jr., *Microporous Mesoporous Mater.* 2003, 63, 75.
b) S. Madhugiri, A. Chacko, J. P. Ferraris, K. J. balkus Jr., *Polym. Prepr.* (*Am. Chem. Soc., Div. Polym. Chem.*) 2003, 44, 86.
c) M; Maclas, A. Chacko, J. P. Ferraris, K. J. Balkus Jr.

[5] a) D. Li, Y. Xia, *Nano Lett.* 2003, 3, 555.
b) D. Li, Y. Wang, Y. Xia, *Nano lett.* 2003, 3, 1167.
c) D. Li, T. Herricks, Y. Xia, *Appl. Phys. Lett.* 2003, 83, 4586.

[6] a) H. Dai, J. Gong, H. Kim, D. Lee, *Nanotechnology* 2002, 13, 674.
b) P. Viswanathamurthi, N. Bhattarai, H. Y. Kim, D. R. Lee, S. R. Kim, M. A. Morris, *Chem. Phys. Lett.* 2003, 374, 79.
c) C. Shao, H.-Y Kim, J. Gong, B. Ding, D. R Lee, S.-J. Park, *Mater. Lett.* 2003, 57, 1579.
d) H. Guan, C. Shao, B. Chen, J. Gong, X. Yang, *Inorg. Chem. Comm.* 2003, 6, 1409.
e) H. Guan, C. Shao, B. Chen, J. Gong, X. Guan, *Inorg. Chem. Comm.* 2003, 6, 1302.
f) X. Yang, C. Shao, H. Guan, X. Li, J. Gong, *Inorg. Chem. Comm.* 2004, 7, 176.
g) B. Ding, H. Kim, C. Kim, M. Khil, S. Park, *Nanotechnology* 2003, 14, 532.
h) P. Viswanathamurthi, N. Bhattarai, H. Y. Kim. D. R. Lee, *Scr. Mater.* 2003, 49, 577.
i) H. Guan, C. Shao, S. Wen., B. Chen, J. Gong, X. Yang, *Mater. Chem. Phys.* 2003, 6, 1302.
j) P. I. Gourma, *Rev. Adv. Mater. Sci* 2003, 5, 147.
k) N. Dharmaraj, H. C. Park, B. M. Lee, P. Viswanathamurthi, H. Y. Kim, D. R. Lee, *Inorg. Chem. Comm.* 2004, 7, 431.

[7] a) K. J. Senecal, D. P. Ziegler, J. He, R. Mosurkal, H. Schreuder-Gibson, L. A. Samuelson, *Mater. Res. Soc. Symp. Proc.* 2002, 788, 285.
b) A. Pedicini, R. J. Farris, *J. Polym. Sci, Polym. Phys. Ed.* 2004, 42, 752.

c) N. Viriyabanthorn, J. L. Mead, R. G. Stacer, C. Sung, *Polym. Prepr. (Am. Chem. Soc. Div. Polym. Chem.)* 2003, 44, 136.
d) Q. B. Yang, D. M. Li, Y. L. Hong, Z. Y. Li, C. Wang, S. L. Qiu, Y. Wei, *Synth. Met.* 2003, 137, 973.
e) H. Yang, L. Loh, T. Han, F. Ko, *Polym Prepr (Am. Chem. Soc., Div. Polym. Chem.)* 2003, 44, 163.
[8] a) H. Hou, Z. Jun, A. Reuning, A. Shaper, J. H. Wendorff, A. Geriner, *Macromolecule* 2002, 16, 2429.
b) H. Hou, D. H. reneker, *Adv. Mater.* 2004, 16, 69. c) X. Hao, Z. Li, C. Wang, *Polym. Prep. (Am. Chem. Soc., Div. Polym. Chem.)* 2003, 44, 149.
[9] a) F. Ko, Y. Gogotsi, AA. Ali, N. Naguib, H. Ye, G. Yang, C. Li, P. Willis, *Adv. Mater.* 2003, 15, 1161.
b) Y. Dror, W. Salalha, R. L. Khatin, Y. Cohen, A. L. Yarin, E. Zussman, *Langmuir* 2003, 19, 7012,
c) C. Seoul, Y.-T Kim, C.-K Baek, *J. Polym. Sci, Polym. Phys. Ed.* 2003, 41, 1572.
d) J. A. Stuckey, M. D. Alexander, Jr., B. M. Black, J. D. Henes, *Polym. Prepr. (Am. Chem. Soc., Dic. Polym. Chem.)* 2003, 44, 141.
e) R. Sen, B. Zhao, D. Perea, M. E. Itkis, H. Hu, J. Love, E. Bekyarova, R. C. Haddon, *Nano Lett.* 2004, 4, 459.
[10] a) Y. K. Luu, K. Kim, B. S. Hsiao, B. Chu, M. Hadjiargyrou, *J Controlled Release* 2003, 89, 341.
b) J. Zeng, X. Xu, X. Chen, Q. Liang, X. Bian, L. Yang, X. Jing, *J Controlled Release* 2003, 92, 227.
[11] E. H. Sanders, R. Kloefkorn, G. L. Bowlin, D. G. Simpson, G. E. Wnek, *Macromolecules* 2003, 36, 3803.
[12] a) K. Kim, C. Chang, X. Zong, D. Fang, B. S. Hsiao, B; Chu, M. Hadjiargyrou, *Polym. Prep. (Am. Chem. Soc., Div. Polym. Chem.)* 2003, 44, 98.
b) C. Drew, X. Wang, L; A. Samuelson, J. Kumar, *J Macromol Sci, Pure Appl Chem.* 2003, A40, 1415.
[13] a) R. H. Baughman, A. A. Zakhidov, W. A. de Heer, *Science* 2002, 297, 787.
b) R. Tenne, *Angew. Chem. Int. Ed.* 2003, 42, 5124.
c) C. R. Martin, *Science* 1994, 266, 1961.
d) J; Goldberger, R. He, Y. Zhang, S. Lee, H. Yan, H.-J. Choi, P. Yang, *Nature* 2003, 422, 599.
e) B. Mayers, X; Jiang, D. Sunderland, B. Cattle, Y. Xia, *J. Am. Chem. Soc.* 2003, 125, 13 364.
f) M. Steinhart, Z. Jia, K. Schaper, R. B. Wehrspohn, U. Gösele, J. H. Wendorff, *Adv. Mater* 2003, 15, 706.
g) Y. Sun, Y. Xia, *Adv. Mater* 2004, 16, 264.
[14] a) R. A. Caruso, J. H. Schattka, A. Greiner, *Adv. Mater* 2001, 13, 1577;
b) H. Dong, S. Prasad, V. Nyame, W. E. Jones, Jr., *Chem. Mater* 2004, 16, 371.
c) F. Ochanda, A. Atkinson, W. E. Jones, Jr. *Polym. Prepr (Am. Chem. Soc., Div. Polym. Chem.)* 2003, 44, 161.
[15] M. Wei, J. Mead, C. Sung, *Polym. Prepr (Am. Chem. Soc., Div. Polym. Chem.)* 2003, 44, 79.
[16] a) Z. Sun, E. Zussman, A. L. Yarin, J. H. Wendorff, A. Greiner, *Adv. Mater.* 2003, 15, 1929.
b) D. Li, Y. Xia, *Nano. Lett.* 2004, 4, 933.
c) I. G. Loscertales, A. Barrero, I. Marquez, R. Spretz, R. Velarde-Ortiz, G. Larsen, *J. Am. Chem. Soc.* 2004, 126, 5376.
[17] M. Bognitzki, T. Frese, M. Steinhart, A. Greiner, J. H. Wendorff, A. Schaper, M. Hellwig, *Polym. Eng. Sci* 2001, 41, 982.
[18] a) M. Bognitzki, W. Czado, T; Frese, A. Schaper, M; Hellwig, M. Steinhart, A. Greiner, J. H. Wendorff, *Adv. Mater* 2001, 13, 70.
[19] a) S. Megelski, J. S. Stephens, D. B. Chase, J. F. rabolt, *Macromolecules* 2002, 35, 8456.
b) C. L. Casper, J. S; Stephens, N. G; Tassi, D. B. Chase, J. F. Rabolt, *Macromolecules* 2004, 37, 573.
[20] S. Madhugiri, A. Dalton, J. Gutierrez, J. P. Ferraris, K. J. Balkus, *JACS* 2003, 125, 14531.
[21] J. Choi, K. Min Lee, R. Wycisk, P. N. Pintauro, P. T. Mather, *Macromolecules* 2008, 41, 4569. H. Chen, J. D. Snyder, Y. A. Elabd, *Macromolecules* 2008, 41, 128.
[22] E. Formo, E. Lee, D. Campbell, Y. Xia, *Nanoletters,* 2008, 8, 668.

What is claimed is:

1. Organic-inorganic hybrid nanofibers comprising two phases:
   a first mineral phase comprising a structured mesoporous network with open porosity; and
   a second organic phase comprising an organic polymer, wherein said second organic phase is not present inside pores of the structured mesoporous network;
   wherein the first mineral phase has organic chemical functional groups, and wherein the second organic phase has organic chemical functional groups; wherein the organic chemical functional groups of the first mineral phase and the second organic phase are respectively chosen from among conductive and/or hydrophilic functional groups; and
   wherein said conductive functional groups are selected from the group consisting of cation exchange groups and anion exchange groups;
   wherein the cation exchange groups are selected from the group consisting of —$SO_3M'$; —$PO_3M'_2$; and —$B(OM')_2$, where M' represents hydrogen and a monovalent metallic cation; and
   wherein the anion exchange groups are selected from the group consisting of pyridyl, imidazolyl, pyrazolyl, triazolyl, and radicals of formula —$^+N(R^6)_3X'^-$ and —$^+NR^8X'$ groups;
   wherein X' represents an anion, and
   where each $R^6$ is independently selected from the group consisting of H, an alkyl group, an aryl group, aromatic and non-aromatic basic radicals containing at least one radical selected from the group consisting of imidazole, vinylimidazole, pyrazole, oxazole, carbazole, indole, isoindole, dihydrooxazole, isooxazole, thiazole, benzothiazole, isothiazole, benzoimidazole, indazole, 4,5-dihydropyrazole, 1,2,3-oxadiazole, furazane, 1,2,3-thiadiazole, 1,2,4-thiadiazole, 1,2,3-benzotriazole, 1,2,4-triazole, tetrazole, pyrrole, aniline, pyrrolidine, and pyrazole radicals; and the —$^+NR^8X'$ groups, and $R^8$ is a group, which forms with nitrogen $^+N$ a cycle of 4 to 10 ring atoms including carbon and nitrogen atoms; and
   wherein said organic chemical functional groups of the first mineral phase are located at a surface of the pores of the structured mesoporous network, and are bonded covalently to walls of the structured mesoporous network,
   wherein the organic-inorganic hybrid nanofibers further comprise nanoparticles of metal oxides, wherein the nanoparticles of the metal oxides spread and are bounded on at least one of external surfaces of the organic-inorganic hybrid nanofibers, and wherein a metal of the metal oxides is selected from the group consisting of gold, silver, platinum, palladium, nickel, copper, ruthenium, rhodium, cobalt, and an alloy thereof.

2. The organic-inorganic hybrid nanofibers according to claim 1, wherein the structured mesoporous network with open porosity is aligned in a determined, particular direction.

3. The organic-inorganic hybrid nanofibers according to claim 1, wherein the first mineral phase and the second organic phase are continuous and interwoven.

4. The organic-inorganic hybrid nanofibers according to claim 1, wherein the organic-inorganic hybrid nanofibers comprise a core consisting of the first mineral phase surrounded by a sheath consisting of the organic phase.

5. The organic-inorganic hybrid nanofibers according to claim 1, wherein the first mineral phase is discontinuous, and dispersed in the organic phase, which is continuous.

6. The organic-inorganic hybrid nanofibers according to claim 1, further comprising a third phase, inside the pores, consisting of at least one structuring, texturizing agent, optionally having organic chemical functional groups.

7. The organic-inorganic hybrid nanofibers according to claim 1, further comprising catalytic nanoparticles.

8. The organic-inorganic hybrid nanofibers according to claim 1, wherein the first mineral phase consists of at least one oxide selected from the group consisting of metal oxides, oxides of metalloids, and mixed oxides thereof.

9. The organic-inorganic hybrid nanofibers according to claim 1, wherein the structured mesoporous network has an organised structure with a repeating unit.

10. The organic-inorganic hybrid nanofibers according to claim 9, wherein the structured mesoporous network has a cubic, hexagonal, lamellar, vermicular, vesicular or bicontinuous structure.

11. The organic-inorganic hybrid nanofibers according to claim 1, wherein a size of the pores of the structured mesoporous network is 1 to 100 nm.

12. The organic-inorganic hybrid nanofibers according to claim 1, wherein the organic polymer is a thermostable polymer.

13. The organic-inorganic hybrid nanofibers according to claim 6, wherein the texturizing, structuring agent is selected from the group consisting of surfactants; acids; bases; phospholipids; amphiphilic multi-block copolymers including at least one hydrophobic block associated with at least one hydrophilic block.

14. A membrane comprising the organic-inorganic hybrid nanofibers according to claim 1, optionally deposited on a support.

15. An electrode comprising the organic-inorganic hybrid nanofibers claim 1.

16. A fuel cell comprising at least one membrane according to claim 14.

17. A method of preparing organic-inorganic hybrid nanofibers, according to claim 1, comprising:
a) preparing at least one solution, in a solvent, of a mineral precursor A and/or of an organomineral precursor C to constitute the first mineral phase;
b) adding at least one structuring, texturizing agent D of a mesoporous mineral phase to the solution prepared in step a), whereby a solution S1 is obtained; and, optionally, said solution S1 is hydrolysed and left to age;
c) preparing a solution S2 of an organic polymer E in a solvent;
d) carrying out simultaneous, separate electrically assisted extrusion of the solution S1 and of the solution S2 with a bicapillary electrically assisted extrusion device; or alternatively carrying out the electrically assisted extrusion of a mixture, optionally aged, of the solution S1 and the solution S2 with a monocapillary extrusion device; wherein said bicapillary electrically assisted extrusion device and said monocapillary extrusion device respectively comprise at least one syringe containing a solution(s) connected to a needle to which a voltage is applied, and a manifold or support, whereby a deposit of organic-inorganic hybrid nanofibers is obtained on the manifold or support;
e1) carrying out heat treatment to consolidate the deposit of the organic-inorganic hybrid nanofibers; or, alternatively,
e2) carrying out heat treatment to eliminate the organic polymer E, the structuring, texturizing agent D, and optionally the support, by calcination;
f) totally or partially eliminating optionally, on conclusion of step e1, the structuring, the texturizing agent D and/or the organic polymer E;
g) separating or eliminating optionally, on conclusion of step e1) step e2) or step f) the support;
wherein the organic polymer E and/or the structuring, texturizing agent D carries (carry) organic chemical functional groups and/or precursor functional groups of these organic chemical functional groups, and/or
the organomineral precursor C is a compound having (i) organic chemical functional groups or precursors thereof, that may be conductive and/or have hydrophilic functions, and (ii) functional groups which may become bonded to the surface of the pores of the structured mesoporous network.

18. The method according to claim 17, wherein the mineral precursor A is selected from the group consisting of metal salts, salts of metalloids, metal alkoxides, and alkoxides of metalloids.

19. The method according to claim 17, wherein a chelating agent B is also added to the solution S1.

20. The method according to claim 17, wherein the solution S1, the solution S2, or a mixture of the solutions S1 and S2, have a viscosity of 40 to 7,000 cps at 20° C.

21. The method according to claim 17, wherein a concentration in the solution S1 of the mineral precursor A and/or of the organomineral precursor C, and a concentration in the solution S2 of polymer E, expressed as a dry extract, are 15 to 60% by mass.

22. The method according to claim 17, wherein the solvents of the solutions S1 and S2 are low-volatility solvents, a vapour tension of which is lower than that of ethanol.

23. The method according to claim 17, wherein the solution S1 is left to age at a temperature of 0° C. to 300° C.; at a pressure of 100 Pa to $5 \cdot 10^6$ Pa; over a period of several minutes to several days.

24. The method according to claim 17, wherein, prior to the electrically assisted extrusion, the solution S1 and/or the solution S2 is (are) preheated to a temperature of 40° C. to 80° C.

25. The method according to claim 17, wherein the electrically assisted extrusion is controlled by acting on one or more of the following parameters:
a deposition temperature;
a relative humidity of an atmosphere in which the deposition is carried out;
a voltage applied to the needle;
a flow speed of the solutions or of the mixture in the syringe;
a distance between the needle and the manifold or support;
the atmosphere in which the deposition is carried out.

26. The method according to claim 25, wherein one or more of the parameters is (are) chosen in accordance with the following:

deposition temperature: 20° C. to 200° C.;
relative humidity of the atmosphere in which the deposition is carried out: 0 to 90%;
voltage applied to the needle; 2 to 25 kV;
flow speed of the solutions or of the mixture in the syringe: 0.1 to 20 mL/h;
distance between the needle and the manifold or support: 2 to 25 cm;
atmosphere wherein the deposition is carried out: Air, Nitrogen or Argon.

27. The method according to claim 17, wherein the solution S1 and/or the solution S2 comprise(s) catalytic nanoparticles.

28. The method according to claim 27, wherein a suspension of catalytic nanoparticles is spray-coated in a jet coming out of the needle of the electrically assisted extrusion device.

29. The method according to claim 17, wherein the method further comprises releasing or generating the organic chemical functional groups of the first mineral phase on the surface of the pores of the organic-inorganic hybrid nanofibers.

30. The organic-inorganic hybrid nanofibers according to claim 1, wherein the monovalent metallic cation is selected from the group consisting of $Li^-$, $Na^+$, $K^+$, and $—N^+(R^4)_3$; and wherein each $R^4$ represents independently a hydrogen, an alkyl radical or an aryl radical.

31. The organic-inorganic hybrid nanofibers according to claim 1, wherein the X' anion is selected from the group consisting of F, Cl, Br, I, $NO_3$, $SO_4H$ and $OR^7$, wherein $R^7$ represents an alkyl group or an aryl group.

32. The organic-inorganic hybrid nanofibers according to claim 1, wherein $^+NR^8X'$ group is selected from the group consisting of imidazolinium, pyridinium, and pyrazolium cycle.

33. The organic-inorganic hybrid nanofibers according to claim 1, wherein the anion exchange group is an imidazolinium group.

34. The organic-inorganic hybrid nanofibers according to claim 1, wherein when $R^6$ is an alkyl group or an aryl group, the alkyl group has from 1 to 10 C and the aryl group has from 6 to 10 C.

35. The organic-inorganic hybrid nanofibers according to claim 30, wherein when $R^4$ is an alkyl radical or an aryl radical, the alkyl radical has from 1 to 10 C and the aryl radical has from 6 to 10 C.

36. The organic-inorganic hybrid nanofibers according to claim 31, wherein when $R^7$ is an alkyl group or an aryl group, the alkyl group has from 1 to 10 C and the aryl group has from 6 to 10 C.

37. The organic-inorganic hybrid nanofibers according to claim 1, wherein the cation exchange groups are selected from the group consisting of $—SO_3M'$; $—PO_3M'_2$; and $—B(OM')_2$, where M' represents hydrogen or a monovalent metallic cation.

38. The organic-inorganic hybrid nanofibers according to claim 1, wherein the cation exchange groups are selected from the group consisting of $—PO_3M'_2$ and $—B(OM')_2$, where M' represents hydrogen or a monovalent metallic cation.

39. The organic-inorganic hybrid nanofibers according to claim 1, wherein the nanoparticles of the metal oxides are distributed throughout the first mineral phase or the second organic phase or throughout both phases.

* * * * *